US011288508B2

(12) United States Patent
Vo et al.

(10) Patent No.: US 11,288,508 B2
(45) Date of Patent: Mar. 29, 2022

(54) SYSTEM AND METHOD FOR MACHINE LEARNING-DRIVEN OBJECT DETECTION

(71) Applicant: SenSen Networks Group Pty Ltd, Abbotsford (AU)

(72) Inventors: Nhat Vo, Abbotsford (AU); Subhash Challa, Abbotsford (AU); Louis Quinn, Abbotsford (AU)

(73) Assignee: SENSEN NETWORKS GROUP PTY LTD, Victoria (AU)

( * ) Notice: Subject to any disclaimer, the term of this patent is extended or adjusted under 35 U.S.C. 154(b) by 0 days.

(21) Appl. No.: 16/652,837

(22) PCT Filed: Oct. 2, 2018

(86) PCT No.: PCT/AU2018/051071
§ 371 (c)(1),
(2) Date: Apr. 1, 2020

(87) PCT Pub. No.: WO2019/068141
PCT Pub. Date: Apr. 11, 2019

(65) Prior Publication Data
US 2020/0302168 A1 Sep. 24, 2020

(30) Foreign Application Priority Data
Oct. 2, 2017 (AU) ................................ 2017903975

(51) Int. Cl.
*G06K 9/00* (2006.01)
*G06T 7/11* (2017.01)
(Continued)

(52) U.S. Cl.
CPC ..... *G06K 9/00624* (2013.01); *G06K 9/00369* (2013.01); *G06K 9/3233* (2013.01);
(Continued)

(58) Field of Classification Search
CPC ........... G06K 9/00624; G06K 9/00369; G06K 9/3233; G06K 9/6217; G06T 7/11;
(Continued)

(56) References Cited

U.S. PATENT DOCUMENTS 8,926,421 B2 * 1/2015 Arezina .............. G07F 17/3211
463/20
10,032,335 B2 * 7/2018 Shigeta ............... G07F 17/3251
(Continued)

FOREIGN PATENT DOCUMENTS

EP 1335783 B1 10/2007
WO WO-2017/197452 A1 11/2017

OTHER PUBLICATIONS

Woolley et al. "Conceptualising poker machine gambling as a technologival zone" TASA & SAANZ Joint Conference 2007, pp. 1-9.*
(Continued)

*Primary Examiner* — Mia M Thomas
(74) *Attorney, Agent, or Firm* — Harness, Dickey & Pierce, P.L.C.

(57) ABSTRACT

Embodiments relate to systems and methods for gaining monitoring. In particular, embodiments relate to systems and methods for gaining monitoring based on machine learning processes configured to analyse captured images to identify or detect game objects and game events to monitor games.

16 Claims, 13 Drawing Sheets

(51) Int. Cl.
| | | |
|---|---|---|
| *G06K 9/32* | (2006.01) | |
| *G06K 9/62* | (2006.01) | |
| *G06N 3/04* | (2006.01) | |
| *G06N 3/08* | (2006.01) | |
| *G07F 17/32* | (2006.01) | |
| *H04N 7/18* | (2006.01) | |

(52) U.S. Cl.
CPC ......... *G06K 9/6217* (2013.01); *G06K 9/6267* (2013.01); *G06N 3/0454* (2013.01); *G06N 3/08* (2013.01); *G06T 7/11* (2017.01); *G07F 17/3206* (2013.01); *H04N 7/183* (2013.01)

(58) Field of Classification Search
CPC .... G06N 3/0454; G06N 3/08; G07F 17/3206; G07F 17/3227
See application file for complete search history.

(56) References Cited

U.S. PATENT DOCUMENTS

| | | | | |
|---|---|---|---|---|
| 10,192,395 | B2* | 1/2019 | Chun | G07F 17/3211 |
| 10,249,140 | B1* | 4/2019 | Gauffin | A63F 13/67 |
| 10,504,320 | B2* | 12/2019 | Jacques | G07F 17/3209 |
| 10,529,183 | B2 | 1/2020 | Shigeta | |
| 10,540,846 | B2 | 1/2020 | Shigeta | |
| 10,574,650 | B2* | 2/2020 | Wallace | G06K 9/00906 |
| 10,580,254 | B2 | 3/2020 | Shigeta | |
| 10,593,154 | B2 | 3/2020 | Shigeta | |
| 10,600,282 | B2 | 3/2020 | Shigeta | |
| 10,740,637 | B2* | 8/2020 | Garcia Rodriguez | G06Q 20/40 |
| 10,741,019 | B2 | 8/2020 | Shigeta | |
| 10,748,378 | B2 | 8/2020 | Shigeta | |
| 10,755,524 | B2 | 8/2020 | Shigeta | |
| 10,762,745 | B2 | 9/2020 | Shigeta | |
| 10,930,120 | B1* | 2/2021 | Ito | G07F 17/3227 |
| 10,950,095 | B2* | 3/2021 | Hufnagl-Abraham | G07F 17/3225 |
| 11,113,587 | B2* | 9/2021 | Butt | G06K 9/6215 |
| 2002/0111205 | A1* | 8/2002 | Beavers | G06Q 50/34 463/12 |
| 2006/0019739 | A1* | 1/2006 | Soltys | G07F 17/32 463/25 |
| 2006/0128472 | A1* | 6/2006 | Beavers | G07F 17/32 463/42 |
| 2006/0252554 | A1 | 11/2006 | Gururajan et al. | |
| 2006/0287068 | A1* | 12/2006 | Walker | G07F 17/3237 463/25 |
| 2007/0077987 | A1 | 4/2007 | Gururajan et al. | |
| 2013/0165215 | A1* | 6/2013 | Arezina | G07F 17/3211 463/25 |
| 2016/0005263 | A1* | 1/2016 | Keilwert | G07F 17/3206 463/33 |
| 2016/0019748 | A1* | 1/2016 | LeMay | G07F 17/3227 463/20 |
| 2016/0267325 | A1* | 9/2016 | Sundaresan | G06K 9/00624 |
| 2016/0350591 | A1* | 12/2016 | Kraft | G06Q 20/387 |
| 2017/0039807 | A1* | 2/2017 | Shigeta | G07F 17/322 |
| 2017/0069159 | A1 | 3/2017 | Vikranth et al. | |
| 2017/0124415 | A1 | 5/2017 | Choi et al. | |
| 2017/0161987 | A1* | 6/2017 | Bulzacki | G06K 9/00201 |
| 2017/0161993 | A1* | 6/2017 | Chun | G07F 17/3209 |
| 2017/0206431 | A1 | 7/2017 | Sun et al. | |
| 2017/0206693 | A1* | 7/2017 | Sharma | G06T 7/254 |
| 2017/0300116 | A1* | 10/2017 | Lyons | G07F 17/3206 |
| 2017/0304732 | A1* | 10/2017 | Velio | G06K 9/6202 |
| 2017/0337711 | A1* | 11/2017 | Ratner | H04N 19/176 |
| 2018/0034852 | A1* | 2/2018 | Goldenberg | H04L 63/1483 |
| 2018/0096244 | A1* | 4/2018 | Mallinson | H04N 13/366 |
| 2018/0114406 | A1* | 4/2018 | Shigeta | G06K 19/077 |
| 2018/0204411 | A1* | 7/2018 | Deck | G07F 17/3211 |
| 2018/0232987 | A1 | 8/2018 | Shigeta | |
| 2018/0247134 | A1* | 8/2018 | Bulzacki | A63F 3/00157 |
| 2018/0276841 | A1* | 9/2018 | Krishnaswamy | G06K 9/00671 |
| 2018/0300984 | A1* | 10/2018 | Shigeta | G06Q 50/34 |
| 2019/0087661 | A1* | 3/2019 | Lee | G06Q 50/00 |
| 2019/0102988 | A1* | 4/2019 | Shigeta | G07F 17/3293 |
| 2019/0251784 | A1 | 8/2019 | Shigeta | |
| 2019/0251785 | A1 | 8/2019 | Shigeta | |
| 2019/0251786 | A1 | 8/2019 | Shigeta | |
| 2019/0333326 | A1 | 10/2019 | Shigeta | |
| 2019/0340873 | A1 | 11/2019 | Shigeta | |
| 2019/0392680 | A1* | 12/2019 | Shigeta | G07F 17/3251 |
| 2020/0098223 | A1* | 3/2020 | Lyons | G06Q 30/0269 |
| 2020/0111328 | A1* | 4/2020 | Bland | G07F 17/3213 |
| 2020/0265672 | A1 | 8/2020 | Shigeta | |
| 2020/0269136 | A1* | 8/2020 | Gurumurthy | G06N 5/04 |
| 2020/0402342 | A1* | 12/2020 | Kelly | G06N 3/006 |
| 2021/0097278 | A1* | 4/2021 | Liu | G06K 9/6807 |
| 2021/0104114 | A1* | 4/2021 | Eager | G07F 17/3239 |
| 2021/0125451 | A1* | 4/2021 | Shigeta | G06N 3/08 |
| 2021/0264149 | A1* | 8/2021 | Vo | G07F 17/3206 |
| 2021/0343113 | A1* | 11/2021 | Shigeta | A63F 1/18 |
| 2021/0343114 | A1* | 11/2021 | Shigeta | A63F 1/18 |

OTHER PUBLICATIONS

International Search Report and Written Opinion dated Dec. 10, 2018 in International Application No. PCT/AU2018/051071.
"The PASCAL Visual Object Classes Homepage" Mar. 31, 2020 http://host.robots.ox.ac.uk/pascal/VOC/.
"COCO Common Objects in Context" Mar. 31, 2020 http://cocodataset.org/.

* cited by examiner

SYSTEM AND METHOD FOR MACHINE LEARNING-DRIVEN OBJECT DETECTION

CROSS-REFERENCE TO RELATED APPLICATIONS

This application is the National Stage Application under 35 U.S.C. § 371 of International Application No. PCT/AU2018/051071, filed Oct. 2, 2018, which claims priority to Australian Patent Application No. 2017903975, filed on Oct. 2, 2017, the entire contents of each of which are incorporated herein by reference.

TECHNICAL FIELD

The described embodiments relate generally to systems and methods for machine learning-driven object detection. Some embodiments apply such object detection to monitoring table games. Particular embodiments relate to systems and methods for monitoring events in table games at gaming venues.

BACKGROUND

Casinos and other such venues are now using surveillance technology and other management software in an effort to monitor players and plan their business strategy. They seek to deploy real-time behaviour analytics, algorithms (or processes), and player tracking techniques to maximise player revenue, optimise staffing and optimise the allocation of venue floor space to the types of games which maximise venue revenue. Most casino-goers participate in loyalty programs which require them to use player cards instead of coins, paper money, or tickets. This has given casinos the opportunity to record and analyse individual gambling behaviour, create player profiles and record such things as the amount each gambler bets, their wins and losses, and the rate at which they push slot machine buttons. However, table games are less easily monitored than either slot machines or button operated gaming machines.

Systems for monitoring and managing table games have typically proven to be expensive to install and maintain, and have failed to achieve the accuracy levels which are needed to be truly useful. Other options include having sensors in the casino chips and other offline yield management solutions, however these have proven ineffective and expensive to implement. Reliance on random sampling by casino floor operators often does not present an accurate picture of the activity and betting levels in gaming venues and may be difficult to record and report. The operating environment of gaming venues is fast paced, with high amounts of visual and auditory noise and distractions, cards and betting chips can be in disordered positions on the table, and illumination can vary considerably.

It is desired to address or ameliorate one or more shortcomings or disadvantages associated with prior techniques for machine-learning-driven object detection, or to at least provide a useful alternative.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood that the element may be any one of the listed options, or may be any combination of two or more of the listed options.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a gaming monitoring system comprising:
  at least one camera configured to capture images of a gaming surface; and
  computing apparatus in communication with the at least one camera, said computing apparatus configured to analyse the captured images of the gaming surface to automatically apply machine learning processes to identify game objects, game events and players in the captured images.

The machine learning processes may be implemented through one or more neural networks. The one or more neural networks may comprise one or more deep neural networks. The one or more deep neural networks may comprise one or more convolutional neural networks. The one or more neural networks may include a Faster region-based convolutional neural network. At least one of the one or more convolutional neural networks may comprise a region proposal network. At least one of the one or more convolutional neural networks may comprise an object detection network.

The at least one camera may be configured to capture high-resolution images.

Game objects may comprise playing cards or position markers. Game objects may comprise one or more stacks of one or more wager objects.

The computing device may be further configured to automatically identify and estimate the value of each stack of one or more wager objects by: identifying one or more first regions of interest in the captured image that relate to one game object using a trained first region proposal network; identifying a subset of first regions of interest among the one or more first regions of interest that relate to a single stack of one or more wager objects using a trained first object detection network; identifying one or more second regions of interest that relate to part of an edge pattern on each wager object that forms part of the single stack of one or more wager objects in each of the identified subsets of first regions of interest using a trained second region proposal network; identifying a value pattern in each of the one or more second regions of interest using a trained second object detection network; and estimating a total wager value of the single stack of one or more wager objects in each of the subsets of first regions of interest using the identified value patterns and a lookup table.

The system may further comprise associating each of the one or more first regions of interest with a wager area identifier.

The computing apparatus may be further configured to identify a start and end of a game based on a game start and end trigger configuration stored in a data store accessible to the computing apparatus.

Some embodiments relate to a method comprising:
  training a neural network system to: process captured images of a gaming table, identify game wager objects in the captured images, and calculate a value of identified wager objects in the captured images.

Some embodiments relate to a method comprising:
processing captured images of a gaming table through a trained neural network to identify game wager objects in the captured images;
identifying a value associated with each game wager object identified in the captured images; and
determining a game wager value based on the identified values of the identified game wager objects.

The processing may identify game wager objects in at least one of a plurality of distinct wager regions on the gaming table. The determining may comprise determining a total game wager for each distinct wager region in which game objects are identified in the captured images.

Some embodiments relate to a method comprising using a trained neural network to identify a wager object value for a wager object in a captured image of a gaming table.

Some embodiments relate to computing apparatus configured to execute a neural network system for game object identification, comprising:
at least one processor;
memory accessible to the at least one processor and storing code to execute:
 a wager object region proposal network (RPN) to receive image data from captured images of the gaming table; and
 a wager object detection network to receive an output of the wager object RPN;
wherein the wager object detection network detects one or more wager objects in the captured images based on an output of the wager object detection network.

The computing apparatus may further comprise:
a gaming table region proposal network (RPN) to receive image data from captured images of a gaming table;
a gaming table object detection network to receive an output of the gaming table RPN;
wherein the gaming table object detection network detects one or more gaming objects in the captured images based on an output of the gaming table object detection network, wherein the one or more gaming objects are different from the one or more wager objects. The computing apparatus of some embodiments is further configured to determine the illumination of an indicator light on a dealing device on the gaming surface.

In some embodiments, the at least one camera and the computing apparatus are part of a smart phone.

The one or more convolutional neural networks according to some embodiments comprise a convolutional neural network for performing image segmentation to determine an outline of a game object in the captured image.

The convolutional neural network for performing image segmentation according to some embodiments is a Mask R-CNN.

The one or more convolutional neural networks according to some embodiments comprises a game object classifier neural network configured to classify the game object in the determined outline.

DETAILED DESCRIPTION

The described embodiments relate generally to systems and methods for machine learning-driven object detection. Some embodiments apply such object detection to monitoring table games. Particular embodiments relate to systems and methods for monitoring events in table games at gaming venues. Embodiments described herein relate to improvements and/or modifications to systems, methods and techniques described in co-owned International Patent Application No. PCT/AU2017/050452, filed 16 May 2017, the entire contents of which is hereby incorporated herein by reference.

Gaming Monitoring System

Figure 1:
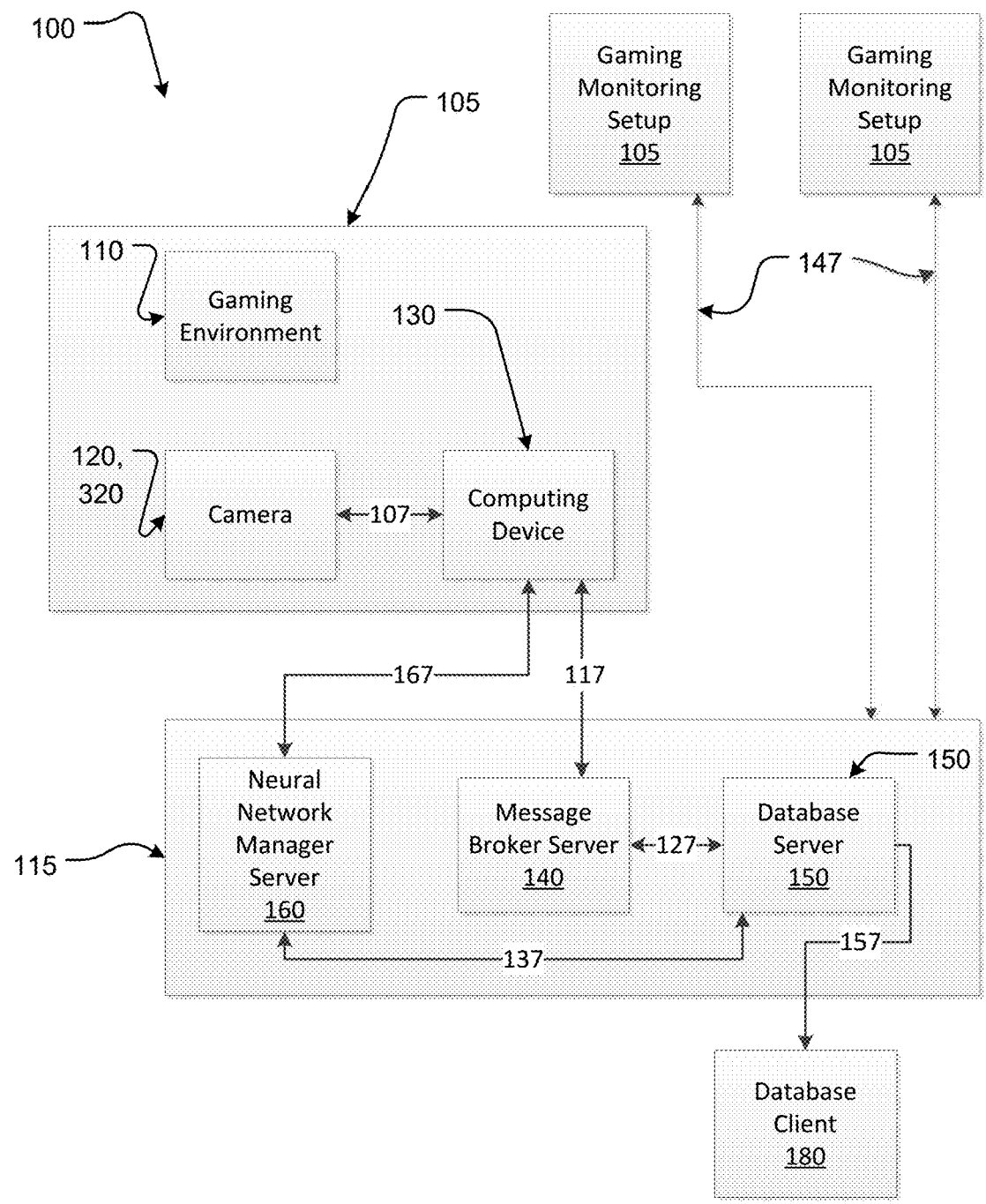
FIG. 1 is a block diagram of a gaming monitoring system according to some embodiments.

FIG. 1 is a block diagram of a Gaming Monitoring System 100 according to some embodiments. The system 100 may comprise a plurality of Gaming Monitoring Setups 105, a Gaming Monitoring Infrastructure 115 and a Database Client 180. The Gaming Monitoring Setup 105 comprises a Gaming Environment 110, a Camera 120 and a Computing Device 130. The system 100 is suited for installation and operation in one or more gaming rooms of a gaming venue, such as a casino. The gaming rooms each have one or multiple gaming tables located therein and some or each of those tables may form part of a respective Gaming Monitoring setup 105.

A gaming venue may have multiple Gaming Environments, for example an area or room where table games are played, and to monitor each one of those Gaming Environments, there may be multiple ones of Gaming Monitoring Setup 105. Multiple Gaming Monitoring Setups 105 may be coupled or linked with a common Gaming Monitoring Infrastructure 115 using a network link 147. The network link 147 may comprise a link 117 between the Computing Device 130 and a Message Broker Server 140 and a link 167 between the Computing Device 130 and a Neural Network Manager Server 160. The Gaming Monitoring Infrastructure 115 may also be coupled with or linked to Gaming Monitoring Setups 105 in two or more different gaming venues. In some embodiments where a gaming venue may have a large number of Gaming Environments 110, multiple ones of Gaming Monitoring Infrastructure 115 may be coupled with different subsets of Gaming Monitoring Setups 105 in the same venue.

The Gaming Monitoring Infrastructure 115 comprises the Message Broker Server 140, the Neural Network Manager Server 160 and the Database Server 150. The Message Broker Server 140 may be connected to a plurality of Computing Devices 130 through the two way Network Link 117. Network link 127 may exist between the Message Broker Server 140 and the Database Server 150 to enable the transfer of data or instructions. Network link 137 may exist between the Database Server 150 and the Neural Network Manager Server 160. The computing device 130 and monitoring infrastructure 115 of System 100 are separate computing systems but are described in combination herein as computing apparatus, since they cooperate to perform various functions described herein and form part of the same computer architecture of system 100.

Each of the servers 140, 150 and 160 may be implemented as standalone servers or may be implemented as distinct virtual servers on one or more physical servers or may be implemented in a cloud computing service. Each of the servers 140, 150 and 160 may also be implemented through a network of more than one servers configured to handle greater performance or high availability requirements. The Database Client 180 may be an end user computing device or an interface to relay data to other end user computing devices or other databases and may be connected to the Database Server 150 through the Network Link 157.

Gaming Environment

Figure 2:
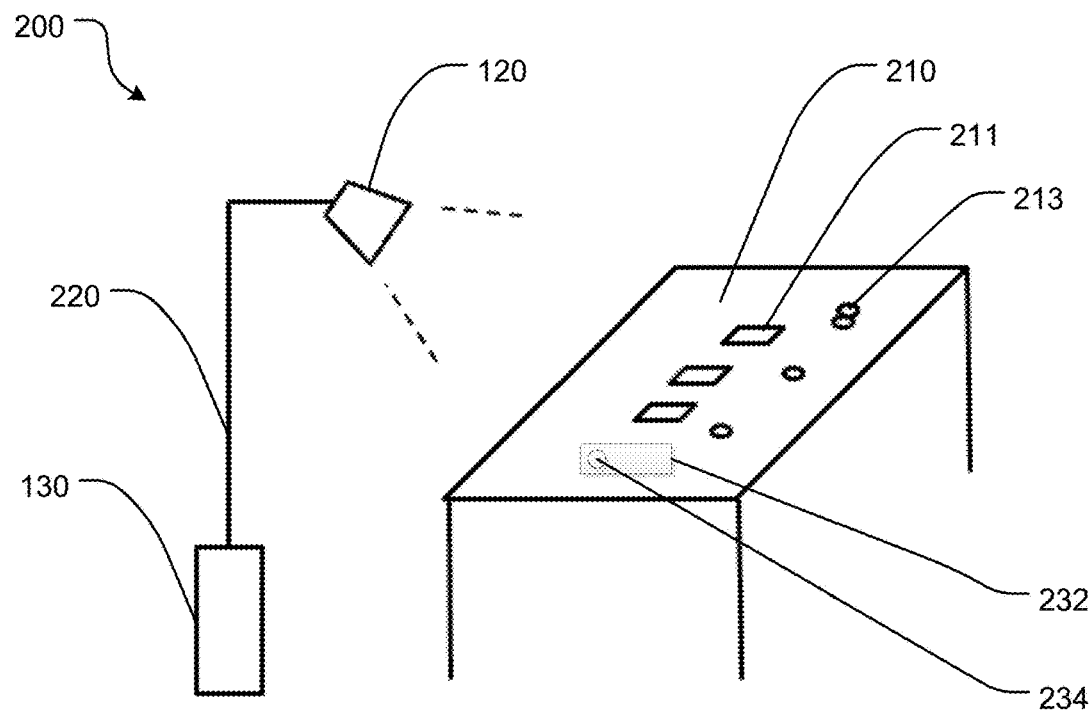
FIG. 2 is a schematic diagram of a system for automated table gaming recognition according to some embodiments, forming part of the Gaming Monitoring System of FIG. 1.

Configuration of a Gaming Environment 110 may vary depending on a specific game being conducted, but most games monitored by any one of the embodiments have some common elements. FIG. 2 illustrates part of a Gaming Monitoring System 200 in accordance with some embodiments. The system may detect the start and end of a specific game, location of one or more stacks of wager objects or chips and the value of wager objects or chips in a stack.

The Gaming Environment 110 comprises a playing surface or a gaming table 210 over and on which the game is conducted. The playing surface 210 commonly comprises a substantially horizontal planar surface and may have placed thereon various game objects, such as cards 211 or chips 213 or other objects, that may be detected by the Gaming Monitoring System 100. The camera 120 may be mounted on a pillar or post 220 at a height so as to position the camera 120 above any obstructions in the field of view of the camera and angled to direct the field of view of the camera 120 somewhat downwardly towards the gaming table 210. The obstructions may be temporary obstructions, such as a dealer conducting a game at a table or a participant of a game or a passer-by, for example. The position of the camera 120 and the computing device 130 may be adjacent to other display screens on a pillar or post that are located at that gaming table 210.

The camera 120 is so positioned to provide a better cross section view of one or more stacks of wager objects while maintaining a reasonable perspective to detect cards on the playing surface and players. An example of the perspective of camera 120, is the image frame 400 shown in FIG. 4A. In the image frame 400, wager objects 213 and cards 211 over the entire playing surface 210 are visible. Also visible in the image frame 400 are designated betting areas or wager areas 410 on the playing surface 210 where one or more wager objects 213 may be placed according to the rules of a specific game being played over the gaming table.

Figure 3:
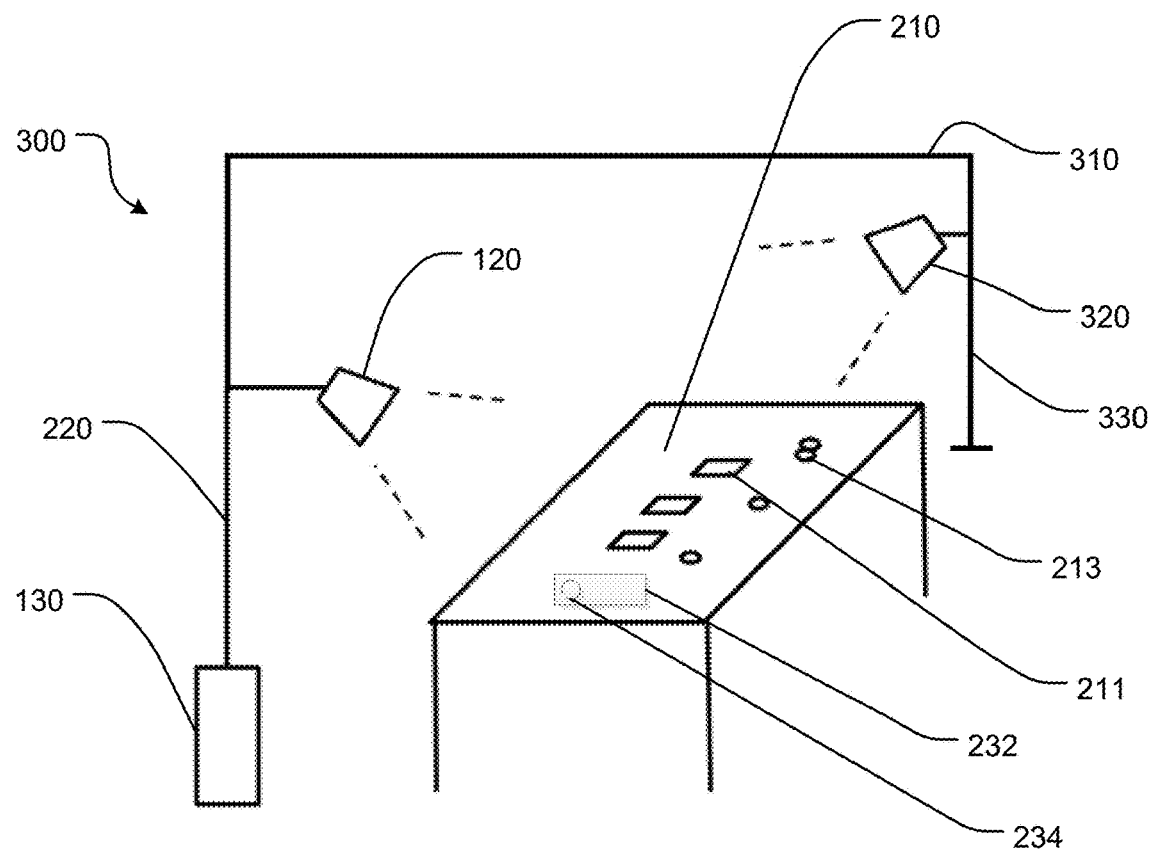
FIG. 3 is a schematic diagram of a system for automated table gaming recognition according to some embodiments, forming part of the Gaming Monitoring System of FIG. 1.

FIG. 3 illustrates part of a Gaming Monitoring System 300 in accordance with some embodiments. The system 300 has two cameras: 120 and 320. The cameras 120 and 320 are mounted on opposite lateral end/sides of the playing surface 210 to capture images of the gaming table 210 and game objects on the gaming table from both lateral ends. Cameras 120 and 320 may have the same physical setup and configuration and/or be identical. The use of two cameras 120, 320 in the system 100 may improve the accuracy of recognition of game objects by allowing for the processing of separate sets of images of the entire playing surface of the gaming table 210 captured by the two cameras. The processing of separates sets of images allows the system 100 to more accurately account for circumstances of inter-ship occlusion, where a chip or stack of chips is hidden from the view of one camera but not the other.

In other embodiments, each camera may be configured to monitor the near half (or a portion of the gaming table 210 that is less than all) of the playing surface, and in doing so the performance or speed of object detection may be improved. In other embodiments, the Gaming Monitoring System may have more than two cameras. The camera 320 may be supported on a support structure 330, such as a pillar, post, gantry, wall or other support. The camera 320 may be connected to the computing device 130 through a communication link 310 that allows the communication of captured images to the computing device 130 from the camera 320 and instructions from the computing device 130 to the camera 320.

In some embodiments, the computing device 130 may be in the form of a smart phone. The camera 120 may be embedded in the computing device 130 in the form of a smart phone camera. The computing device 130 in the form of the smart phone should have the necessary hardware configuration to implement the various machine learning processes according to the embodiments. For example, a Google Pixel 2 phone, or a phone with equivalent technical specifications, may be used as a smart phone to provide the computing device 130 and the camera 120. When computing device 130 is implemented as a smart phone, then the communication interfaces provided in the smart phone may be used to facilitate communication with the neural network managers server 160 and for communication with the message broker server 140. The communication interface used in the smart phone may be a cellular communication interface or the Wi-Fi communication interface provided in the smart phone. Use of a smart phone as the computing device 130 and the camera 120 simplifies the implementation of the gaming monitoring system 105 by utilising a device available off-the-shelf that can be configured to provide part of the gaming monitoring system 105. Use of a smart phone also simplifies the interface between the camera 120 and the computing device 130. In a smart phone, the computing device 130 and the camera 120 are part of a single physical unit and are pre-configured to communicate with each other. In embodiments where more than one camera may be necessary in a gaming monitoring setup 105, two smart phones may be used to provide the two cameras 120 and 320, each with its own computing device 130.

Participants of a game include players who may place bets and dealers who conduct the game. To place bets or conduct the game, objects described as Game Objects are used by the players or dealers. Game Objects may comprise cards 211 in a specific shape with specific markings to identify them, Chips or wager objects 213 or other such objects may designate amounts players may wager in a game, or may comprise other objects with a distinct shape that may designate the outcome of a game such as a position marker or a dolly used in a game of roulette. The game is conducted through a series of Gaming Events that comprises the start of a game, placing of bets by players during a game, intermediate outcomes during a game and the end of a game determining the final outcome of the game. During a game, a player may place bets by placing his or her wager objects 213 (i.e. betting tokens or chips) in a wager area or a betting area designated for placing of bets. The chips or wager objects may be arranged in groups or stacks within a wager area on the playing surface 210. A group or stack of wager objects may comprise a common colour or denomination (associated wager value) of wager objects or it may comprise a combination of wager objects of two or more colours or denominations.

The cameras 120 and 320 may be mounted at a distance of between about 0 and 4 (optionally around 2 to 3) metres from a near edge of the gaming table and may be raised between about 0 to 3 (optionally about 1 to 2) metres above table level, for example. The cameras 120 and 320 may be angled downwardly at an angle in a range of about 15-45 degrees from the horizontal, for example. The cameras 120 and 320 may be suitable for capturing images in a high resolution, such as a resolution of 720p (images of up to 1280×720 pixels) or 1080p (images of up to 1920×1080 pixels) or 4k (images of up to 4096×2160 pixels), for example. The cameras may continuously capture images at the rate of 30 frames per second (fps) or 60 fps or 90 fps, for example. The cameras may communicate the captured images to the computing device 130 through a communication link 107, which may be in the form of a USB cable or a wireless communication link. An example of a suitable camera for each of cameras 120 and 320 is the BRIO 4k Webcam camera from Logitech.

Computing Device

The data generated by the camera 120 is received by the Computing Device 130 through the communication port 590. The port 590 may be in the form of a USB port or a wireless adapter that couples with the camera 120 to receive images captured or transmit instructions to commence or terminate capturing images. Hardware Components 510 of the computing device 130 comprise Memory 514, Processor 512 and other components necessary for operation of the computing device. Memory 514 stores the necessary Software Modules 520 which comprise: an Image Processing Library 522; Camera API 524; Runtime Environment Driver 526; Neural Network Module 528; a Game Event Detection Module 532 and a Message Producer Module 534.

The Image Processing Library 522 is a set of programs to perform basic image processing operations, such as performing thresholding operations, morphological operations on images and other programs necessary for the pre-processing image before providing the images as input to the Neural Networks Module 528. OpenCV is an example of an Image Processing Library that may be employed. The Camera API 524 is a set of programs that enables the Computing Device 130 to establish a communication channel with one or more Cameras 120. This Camera API 424 enables the data generated by the Camera 120 to be received and processed by the Neural Network Module 528.

The Message Producer Module 534 based on instructions from the Neural Network Module 528 produces messages that are passed on to the Message Broker Server 140. The Message Producer Module may be based on a standard messaging system, such as RabbitMQ or Kafka, for example. Based on stored Message Broker Configuration 546 in the Configuration Module 540, the Message Producer Module 534 may communicate messages to the Message Broker Server 140 through the Communication Port 590 and the network link 117. The Configuration Module 540 also comprises Game Start and End Trigger Configuration 544. The Game Start and End Trigger Configuration 544 comprise details of the specific gaming events that designate the start and end of games on a specific table. The components of the Configuration Module 540 may be stored in the form of one or more configuration files in the Memory 514. The configuration files may be stored in an XML format, for example.

Message Broker Server

The Message Broker Server 140 implements a message brokering service and listens for messages from a plurality of Computing Devices 130 through the network link 117. The Message Broker Server 140 may be located on the same premises as the Computing Device 130 within a common local network or it may be located off-premises (remotely) but still in communication via the network link 117 established between the two premises to enable the transfer of messages and data. The Message Broker Server 140 may be centralised and connected to Computing Devices 130 in a plurality of gaming venues to provide a centralised message brokering service.

The Message Broker Server 140 has Hardware Components 610 comprising Memory 614, Processor 612 and other necessary hardware components for the operation of the server. The Message Queue Module 620 implements a queue to receive, interpret and process messages from a plurality of Configuration Devices 130. The messages are received through the Communication Port 690 with may be in the form of a Network Adapter or other similar ports capable of enabling two way transfer of data and instructions to and from the Message Broker Server 140. The Message Queue Module 620 may be implemented through a message broker package such as RabbitMQ or Kafka. The Message Queue Module 620 on receiving a message comprising transaction information regarding gaming events occurring on a gaming table initiates a Database Parsing Module 630. The Database Parsing Module 630 parses the message received by the Message Queue Module 620 into a database query that is subsequently executed on the Database Server 150 through the Network Link 127.

Database Server

The Database Server 150 receives gaming event data from the Message Broker Server 140, serves as a repository for Database Client 180 to provide access to the gaming event data captured by the Gaming Monitoring System 100. The Database Server 150 has Hardware Components 710 comprising Memory 714, Processor 712 and other necessary hardware components for the operation of the server. A Communication Port 790 may be in the form of a Network Adapter or other similar ports capable of enabling two way transfer of data and instructions to and from the Database Server 150 through one or more network links. Database Module 720 may be implemented through a database management system such as MySQL™, Postgres or Microsoft™ SQL Server.

Gaming Event Data 724 comprises transaction data representing Gaming Events that occur on a gaming table or a playing surface. The records forming Gaming Event Data may comprise a timestamp for the time a gaming event was recognised; a unique identifier for the gaming table on which the gaming event occurred; an identifier for the nature of the gaming events such as placing of a bet, intermediate outcome in a game, final outcome of a game; an identifier of a wager area associated with the gaming event; an estimate of a bet value associated with a region of interest; and other relevant attributes representing a gaming event.

The Table Configuration Data 722 comprises: unique identifiers for gaming tables and associated Computing Device 130; nature of game start and end triggering events, whether the start of a game is detected by placing of cards on the playing surface or the placing of a specific gaming object on a specific region of interest; and other relevant data necessary to represent the parameters relied on by the Gaming Monitoring System 100. In some embodiments, the Table Configuration Data 722 and Gaming Event Data 724 may be held in separate database servers to enable greater scalability and manageability of the Gaming Monitoring System 100.

Game Event Detection

In some embodiments the camera 120 may be a high resolution camera that may generate a significant amount of data in real time. Storing and processing all the data generated by such high resolutions camera may present significant challenges in terms of acquiring significant storage and processing capacity to store and process the captured data. Additionally, processing large amount of data through deep neural networks may require a significant amount of processing power through additional processing cores or graphical processing units (GPUs).

To address the above challenge, the Gaming Monitoring System is configured to detect the start and end of games in a Gaming Environment 110 and capture high resolution images only after a game begins. In some embodiments, the captured high resolution images may be processed by the Neural Network Module 528 substantially in real time to identify game objects and estimate the value of wager objects. In other embodiments, the captured high resolution images may be stored in the computing device 130 and processed by the Neural Network Module 528 in a non-real time manner.

Figure 8:
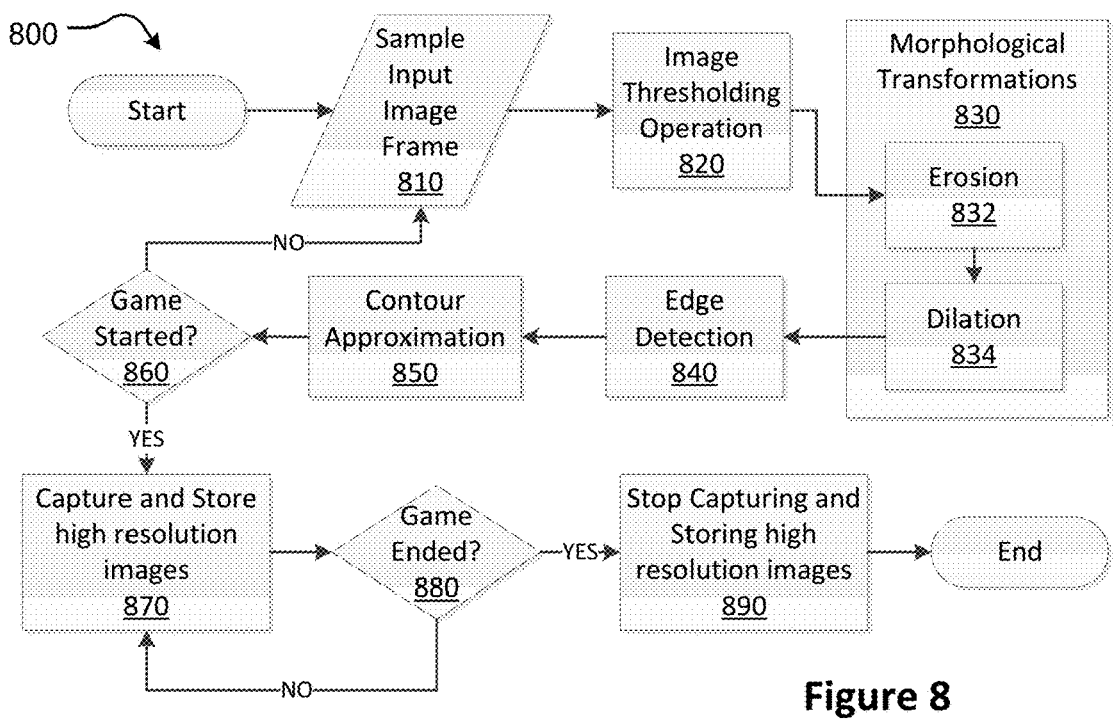
FIG. 8 is a flowchart of a method of detecting a start and end of a game according to some embodiments.

The flowchart 800 in FIG. 8 illustrates a process for detecting start and end of games according to some embodiments. The detection of start and end game events in a Gaming Environment 110 occurs in near real time. The technique of contour detection may be employed to detect the start and end game events. Before the contour detection techniques may be applied, a number of image pre-processing steps are applied to the images captured by the camera 120. These image pre-processing steps improve the performance and accuracy of processes or algorithms implementing the contour detection techniques.

An input image frame may be acquired by the camera(s) 120, 320 at step 810. This input image need not necessarily be a high-resolution image. Some embodiments employ a card detection process, in order to ascertain a start time and end time of a card game. This can be useful information to determine table utilisation and dealer efficiency, for example. Further, storage and processing of high-resolution images can be avoided until it is detected that a game has started and can be stopped once it is determined that a game has ended, thereby providing improved computational efficiency in image processing. According to some embodiments, high-resolution images comprise images of a resolution of 720×480, or 1920×1080, or 3840×2160, for example. According to some embodiments, high-resolution images comprise images of a resolution of more than 720×480, more than 1920×1080, or more than 3840×2160.

For embodiments that employ card-detection processes, one image pre-processing technique that may be employed is thresholding at step 820. One of several thresholding techniques such as global thresholding or adaptive thresholding or otsu's binarization may be employed to segment an image into a binary image with pixels representing black or white portions in the input image.

After the operation of thresholding, morphological transformations at step 830 may be applied to the output image of the thresholding operation. Morphological transformations enhance the features to be detected in the images and improve the performance and accuracy of contour detection processes. Erosion applied at step 832 and Dilation applied at step 834 are examples of morphological transformations that may be applied during the image pre-processing stage. Both the erosion and dilation processes require two inputs, image data in the form of a matrix captured by camera 120 and a structuring element, or kernel which determines the nature of the morphological operation performed on the input image. The Kernel may be in the shape of a square or a circle and has a defined centre and is applied as an operation by traversing through the input image.

The morphological transformation of erosion comprises a sharpening of foreground objects in an image by using a kernel that as it traverses through an image, the value of a pixel is left to a value of 1 or a value corresponding to the white colour only if all the values in corresponding to the kernel are 1 or a value corresponding to the white colour. Kernels of size 3×3 or 5×5 or other sizes may be employed for the operation of erosion. Erosion operation, erodes away the boundary of foreground objects. The operation of erosion may be performed by a predefined library in the Image Processing Library 522.

To achieve erosion the kernel slides through the image (as in 2D convolution). A pixel in the original image (either 1 or 0) will be considered 1 only if all the pixels under the kernel is 1, otherwise it is eroded (made to zero).

The operation of dilation is the inverse of erosion. For example, in a dilation operation using a 3×3 square matrix kernel, the pixel at the centre of the kernel may be left to a value of 1 or a value corresponding to the white colour in any one of the values in the corresponding kernel is 1 or a value corresponding to the white colour. As a consequence of dilation, the features in an image become more continuous and larger. The operation of dilation may be performed by a predefined library in the Image Processing Library 522.

The application of a thresholding technique to an image produces a binary image. To further enhance features present in an image, the morphological transformations of erosion and dilation are applied. Advantageously, the morphological transformations assist in reduction of noise from images, isolation of individual elements and joining disparate elements in an image.

An image contour comprises a curve joining all continuous points along the boundary of an object represented in an image. Contours are a useful tool for shape analysis and object detection and recognition. Contour approximation is used to approximate the similarity of a certain shape to that of the desired shape in the application. The desired shape may be in the form of a polygon or a circle or an ellipse, for example. For better accuracy and performance, contour detection operations may be performed on binary images after edge detection operation has been performed.

Edge detection as applied at step 840 is an image processing technique for finding the boundaries of objects within images. It involves detecting discontinuities in brightness in an input image. Among several edge detection techniques, Canny edge detection is a popular multi-stage edge detection algorithm or process which may be implemented by some embodiments.

Some or all of the steps of edge detection may be performed through programs available in the Image Processing Library 522. For example, if the OpenCV library is used, the "canny" edge detection function call may be used. Other alternative methods of edge detection may also be utilized as an alternative to canny edge detection to get the same result of identification of edges in an input image.

After an edge detection operator has been applied to an input image to identify edges, contour detection processes at step 850 may be applied to the result of the edge detection operation to approximate the similarity of shapes in an image to certain model shapes such as a polygon, or a circle for example.

Contour Approximation approximates a contour shape to another shape (polygon) with a lesser number of vertices, depending upon the precision specified in an embodiment. Some embodiments may implement the Douglas-Peucker algorithm for contour approximation.

Contour approximation operations may be performed using pre-packaged functions in the Image Processing Library 522 by invoking them in the Gaming Monitoring Module 928. For example if OpenCV is used for implementing the contour estimation process, then the functions "findContours" or "drawContours" or "approxPolyDP" may be invoked to implement the process, for example.

In some embodiments the start of a game may be detected at step 860 by detecting the first presence of a card on the gaming table. To detect the presence of cards the contours identified at the end of the contour approximation step are analysed. The analysis includes calculating the area of contours, identifying the number of vertices and the angles formed by the edges of the contours. To identify cards the following criterion may be applied in some embodiments: area of contours between 40 to 70 $cm^2$ or between 50 to 60 $cm^2$; 4 vertices after approximation and angles close to 90 degrees. If one or more of the contours identified are identified as cards, then the Game Event Detection Module 532 signals the start of a game. The signal identifying start of the game may be used as a trigger by the Gaming Monitoring System 100 to initiate capturing and storing high resolution images by the camera 120. These criterion may be specifically calibrated or adjusted depending on the angle or placement of cameras 120 with respect to the gaming surface, or the nature of the cards being used.

The specific nature of the events that define game start and end triggers may be stored in the Game Start and End Trigger Configuration 544 and referred to by the Game Event Detection Module 532 to estimate if a game has started or ended on a table. For example, for a table designated for the game of blackjack, the presence of one or more cards in an image frame may be treated as the start of a game. Likewise, after the start of a game, the absence of any cards in an image frame may be treated as the end of a game at step 880 by the Game Event Detection Module 532. For games not based on cards such as roulette, the presence of other game objects such as a dolly may be used the start and end triggers for a game. The specific shape and nature of a game start or end trigger initiating game object may be saved in the Game Start and End Trigger Configuration 544 of the Configuration Module 540 of the Computing Device 130.

Once the start of a game is identified by the Game Event Detection Module 532 and the camera 120 commences capturing high resolution images at step 870, that the Neural Networks Module 528 may use for object detection and wager value estimation processes. But before the Neural Networks Module 528 may accurately perform these operations, it undergoes training necessary to calibrate, structure or weigh they the neural network to best perform the desired operations according to a particular gaming environment.

Neural Networks Module

In order to detect game objects and estimate value of wager objects on a gaming table, the Gaming Monitoring System 100 relies on training a machine learning process to perform the functions. The machine learning process in some embodiments may employ one or more neural networks. In some embodiments, the one or more neural networks may include one or more deep learning neural networks. In some embodiments, one or more of the deep learning neural networks may be a convolutional neural network (CNN).

A CNN as implemented by some embodiments may comprise multiple layers of neurons that may differ from each other in structure and their operation. A first layer of a CNN may be a convolution layer of neurons. The convolution layer of neurons performs the function of extracting features from an input image while preserving the spatial relationship between the pixels of the input image. The output of a convolution operation may include a feature map of the input image. The operation of convolution is performed using a filter or kernel matrix and the specific weights in the filter or kernel matrix are obtained or calibrated by training the CNN by the processes described subsequently.

After a convolution layer, the CNN in some embodiments implements a pooling layer or a rectified linear units (ReLU) layer or both. The pooling layer reduces the dimensionality of each feature map while retaining the most important feature information. The ReLU operation introduces non-linearity in the CNN, since most of the real-world data to be learned from the input images would be non-linear. A CNN may comprise multiple convolutional, ReLU and pooling layers wherein the output of an antecedent pooling layer may be fed as an input to a subsequent convolutional layer. This multitude of layers of neurons is a reason why CNNs are described as a deep learning algorithm or technique. The final layer one or more layers of a CNN may be a traditional multi-layer perceptron neural network that uses the high-level features extracted by the convolutional and pooling layers to produce outputs. The design of a CNN is inspired by the patterns and connectivity of neurons in the visual cortex of animals. This basis for design of CNN is one reason why a CNN may be chosen for performing the function of object detection in images.

The Neural Network Module 428, may be in the form of a convolutional neural network, such as a region-based convolutional neural network (R-CNN) or a Faster region-based convolutional neural network (Faster R-CNN). Some embodiments may use Resnet-101 or SSD (Single Shot Detector) as the base feature extractor for the Faster R-CNN. The Neural Network Module 428 may be based on other deep learning methods or other machine learning methods. The following part of the specification describes the object detection and training methods for some embodiments based on the Faster R-CNN neural network training process, but this does not in any way limit the applicability of other suitable machine learning or deep learning methods to other embodiments.

Figure 9:
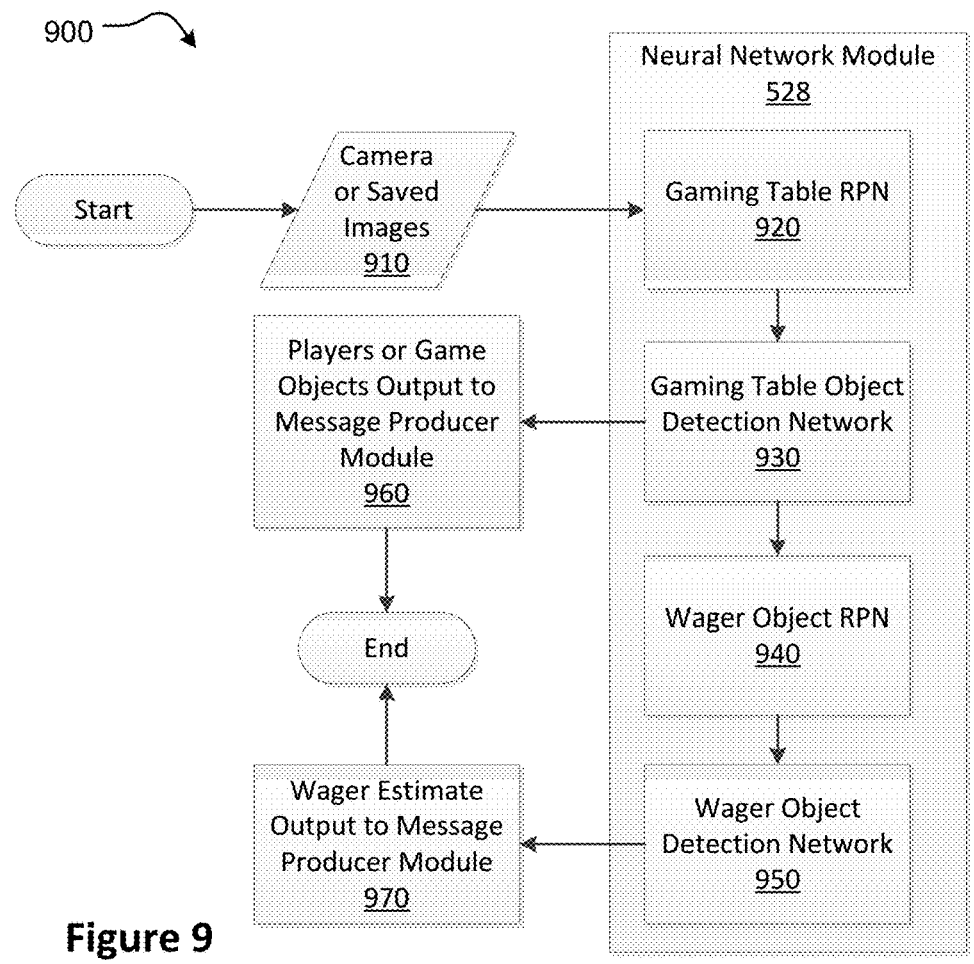
FIG. 9 is a hybrid flowchart and block diagram illustrating operation of a neural network module according to some embodiments.

The flowchart 900 in FIG. 9 illustrates at a high level the operation of the neural networks module 528 according to some embodiments. The neural networks module 528 trains and maintains a gaming table Region Proposal Network (RPN) 920, a gaming table object detection network 930, a wager object RPN 940 and a wager object detection network 950. The object detection and wager value estimation process or method described herein may be performed by a neural network model that is trained according to the Faster R-CNN training process. This training process comprises two high level steps or modules. The first step involves identification or isolation of various proposed regions of interest in an input image by a deep fully convolutional neural network that is also described herein as a Region Proposal Network (RPN). This first step is performed by the Gaming Table RPN 920 and the Wager Object RPN 940. The second step involves using the proposed regions of interest identified by the RPN to perform object detection based on a Fast R-CNN object detector. This step is performed by a Gaming Table Object Detection Network 930 and a Wager Object Detection Network 950.

The RPNs 920 and 940 may take an image as an input and as an output produce one or more object proposals. Each object proposal may comprise the co-ordinates on an image that may define a rectangular boundary of a region of interest with the detected object, and an associated objectness score, which reflects the likelihood that one of a class of objects may be present in the region of interest. The class of objects may comprise cards, wager objects or players or other relevant objects of interest for detection based on the training the RPN may have undergone.

The regions of interest identified in an object proposal by the RPN may overlap or one region of interest may be completely encompassed by another region of interest. The regions of interest may have varying aspect ratios to better approximate the shape of the objects identified in the object proposals.

Training Neural Networks Module

Before the RPN or the Fast R-CNN may be employed to perform object detection on a gaming table or a playing surface, the neural networks are subjected to training based on a substantial training data set. One or more of several known supervised training methodologies may be employed in training the relevant neural networks. The training data set may comprise several images in which boundaries of regions of interest and the identity of the object in every region of interest may have been manually identified and recorded. The boundaries of regions of interest may be recorded through the co-ordinates of the four points of the rectangle defining the region of interest.

Figure 10:
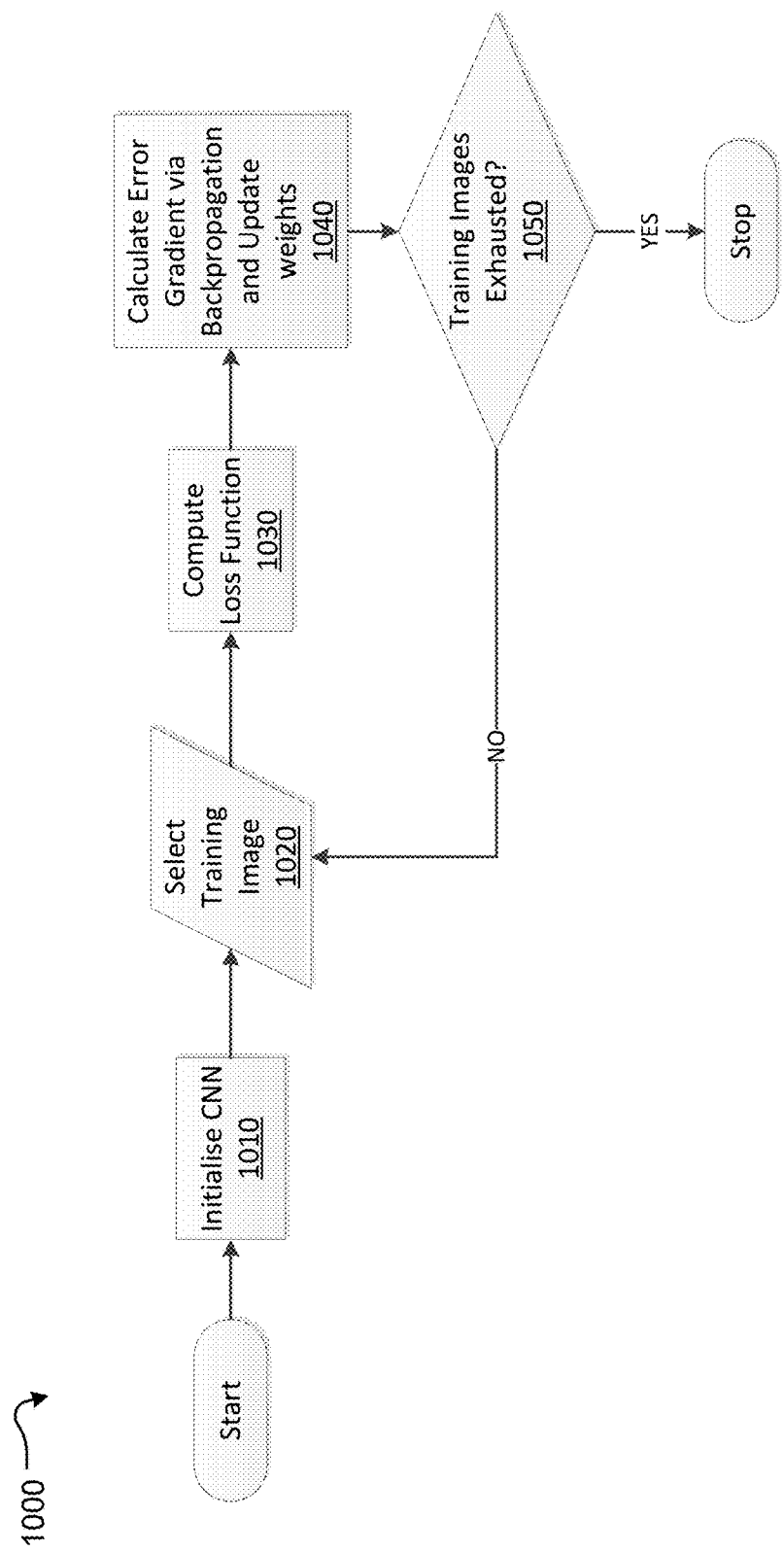
FIG. 10 is a flowchart of a method of training a neural network according to some embodiments.

The flowchart 1000 in FIG. 10 illustrates a training technique or process for a CNN that may be implemented by some embodiments. This training methodology may be implemented to train a RPN such as the Gaming Table RPN 920 or the Wager Object RPN 940. This training methodology may be implemented to train an object detection network, such as the Gaming Table Object Detection Network 930 or the Wager Object Detection Network 950.

An example of suitable hardware and software that can be used to perform method 1000 for training, testing and running deep learning object detection is indicated below.

Hardware:
  a. CPU: Intel i7 7700k Quad Core
  b. RAM: 16 GB
  c. GPU: Dual GTX 1080 Ti with 12 GB of memory each.
Software: training and inference processes can be done using the Tensorflow framework.
  a. Tensorboard: For monitoring training and evaluation of networks.
  b. Models: Tensorflow open source community driven models GitHub repository.
  c. Pre-Trained Models: Tensorflow provides some pre-trained models. These models are trained on large datasets with thousands of different classes ranging from aeroplanes to dogs. Some popular datasets are MSCOCO (http://cocodataset.org/) and Pascal VOC (http://host.robots.ox.ac.uk/pascal/VOC/). In this way, it is possible to fine-tune the models to suit any task. This process is called transfer learning.
  d. Google Compute Cloud Engine: if all local resources are being used, training jobs can be deployed on the Google Compute Cloud Engine.

The required information for training Tensorflow Object Detection (OD) models (as an example model) is:
Image data;
Image height, width and depth;
Object name (card, chip, cash, person) and bounding box coordinates in image (xmin, ymin, xmax, ymax); and
Other parameters such as difficult object, segmented etc can be used but are mainly for database evaluation.
The Pascal VOC format (http://hot.robots.ox.ac.uk/pascal/VOC/) is a suitable XML format for packing OD information for a single image.

As a first step 1010, a CNN may be initialised with parameters or weights that may be randomly generated by drawing from a Gaussian distribution in some embodiments. Alternatively, in some embodiments a previously trained CNN may be used for initiating training. As an example, for training a RPN one or more ground truth regions or boxes may be identified in all the training images 1020. The ground truth regions or boxes identify an object and its boundaries in a training image. The training image may be passed as an input to the initialised RPN to obtain as outputs potential regions of interest.

Based on the outputs of the RPN or CNN, a loss function or an error function may be calculated at step 1030. The output of the loss function may illustrate the differences between the ground truth boxes or regions in the input images and the region proposals produced by the RPN or CNN. The output of the loss function may be used at step 1040 to calculate stochastic gradient descent with respect to the weights in the RPN or CNN. This error gradient may be back-propagated through the RPN or CNN to adjust the weights to minimise the computed error function or loss function. This process may be continued with multiple (numerous) input images until the training data set is exhausted at step 1050.

Relying on the error or loss function described above and the principles of back-propagation and stochastic gradient descent, the RPN or CNN may be trained end to end to improve its accuracy by optimising the error or loss function. After multiple interactions of training with a substantial training data set, the RPN or CNN may perform at an acceptable accuracy levels and can subsequently be incorporated in the Neural Networks Module 528.

The Gaming Table Object Detection Network 930 and the Wager Object Detection Network 950 may be trained on the same principles as identified with respect to the CNN or RPN apart from the difference being that the Object Detection Networks 930 and 950 accept as input the identified region of interests and present as outputs probabilities of presence of a class of objects in the region of interest.

Further the Object Detection Networks 930 and 950 may be trained in conjunction with the Gaming Table RPN 920 and the Wager Object RPN 940 to allow the sharing of convolutional layers between the two networks which may enhance efficiency and accuracy of the Neural Networks Module 528. The training in conjunction may comprise alternating training of the two networks and relying on the output of one network as the input for another. Another alternative for training in conjunction may include merging the two network to form a single network and relying on backpropagation and stochastic gradient distribution to vary of weights of the entire network in every training iteration.

Figure 4A:
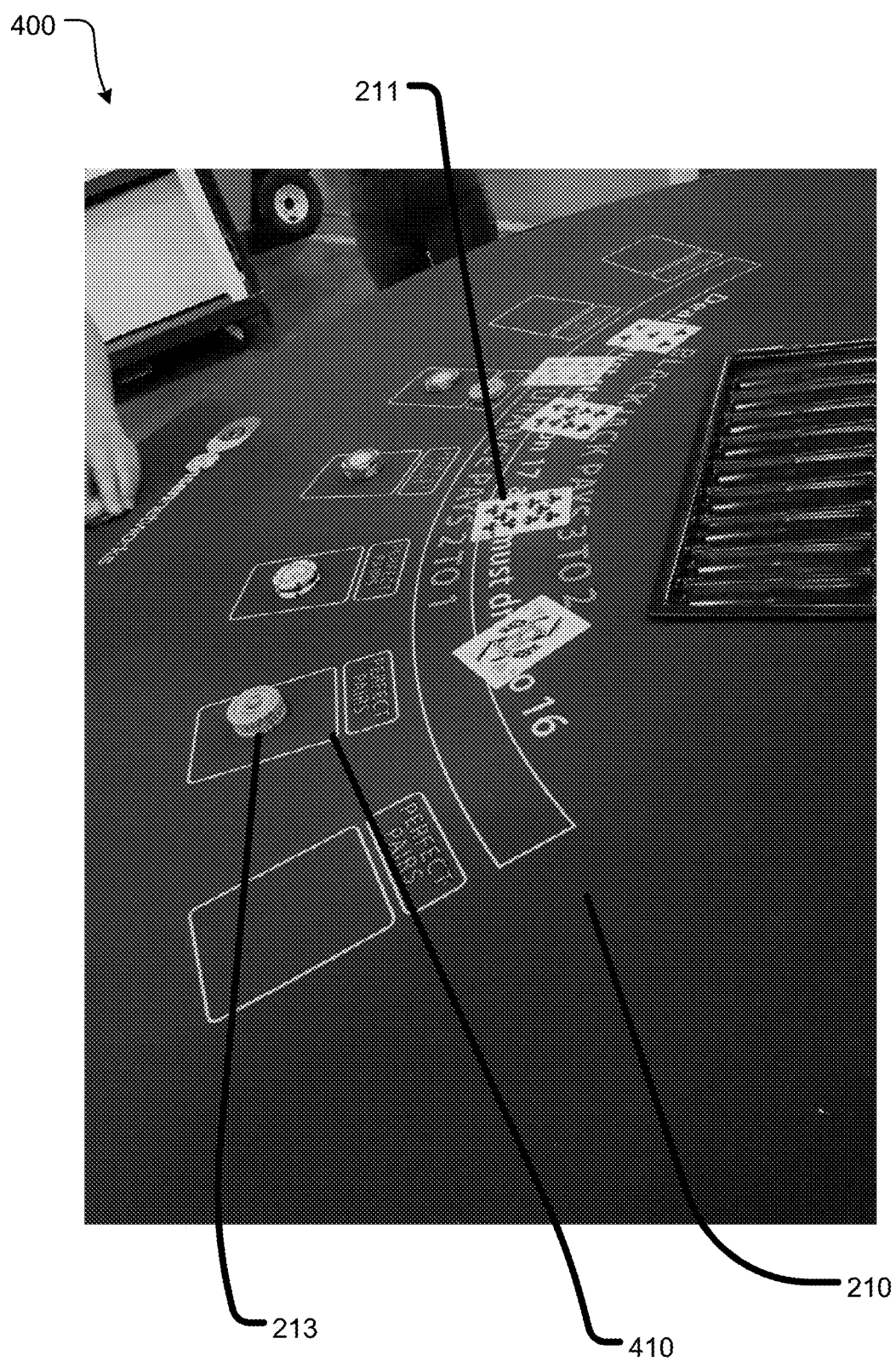
FIG. 4A is an image of a surface of a Gaming Table that may form part of a Gaming Environment of the system of FIG. 1.
Figure 4B:
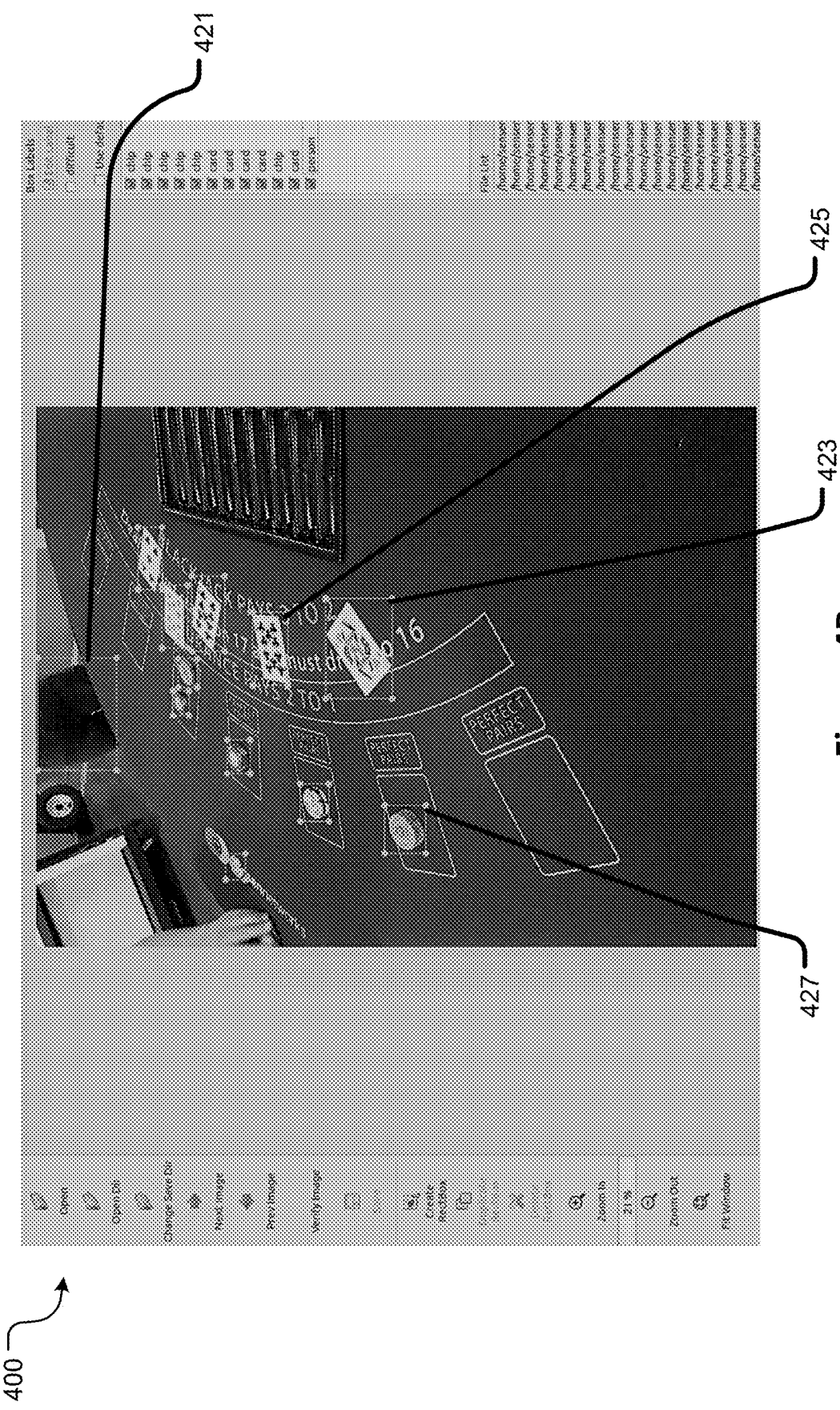
FIG. 4B is an image of a surface of a Gaming Table that is the same as the image of FIG. 4A but showing object annotations for neural network training.
Figure 4C:
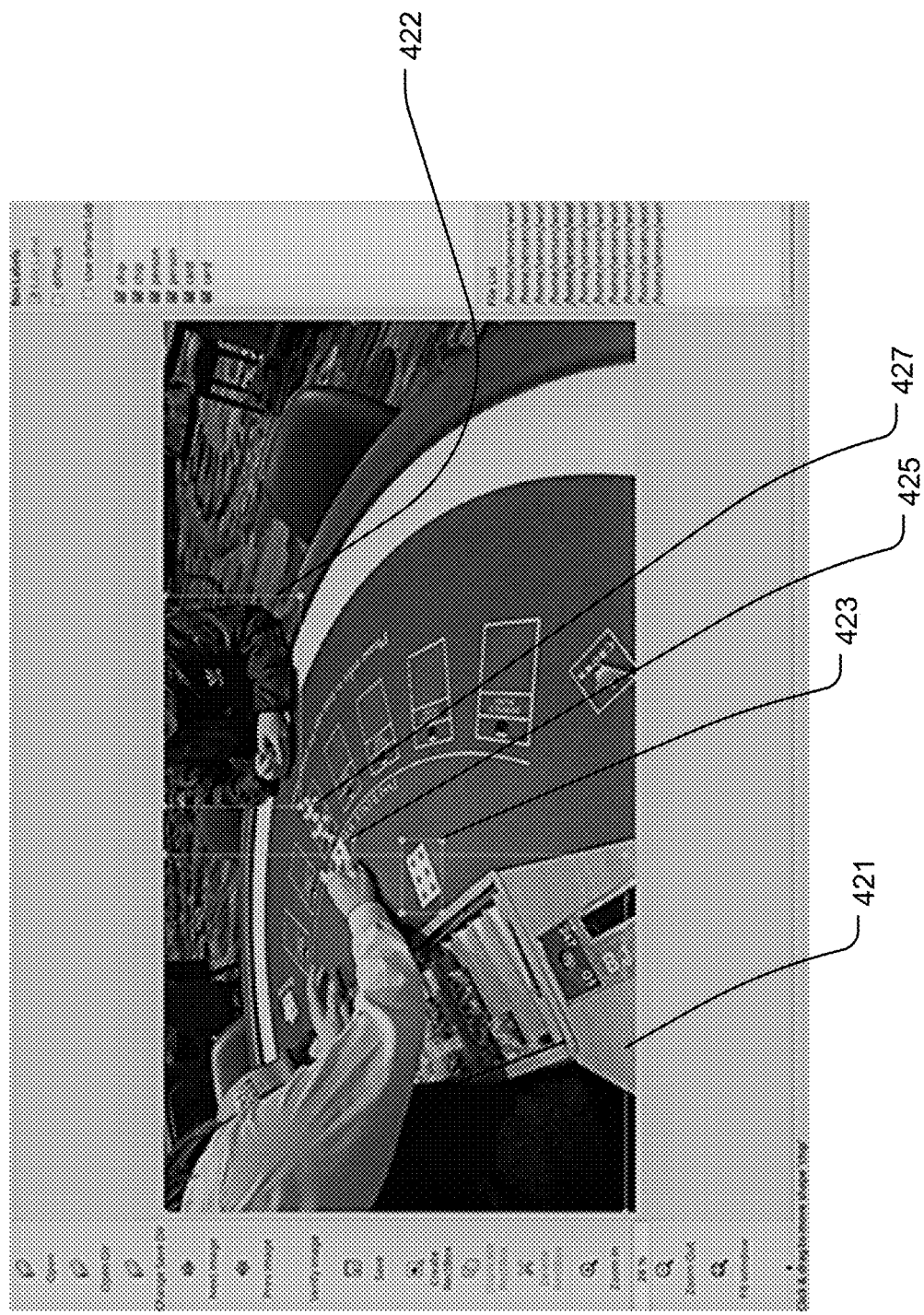
FIG. 4C is screen shot of an annotation tool interface for annotating a neural network training image of a surface of a Gaming Table that may form part of a Gaming Environment of the system of FIG. 1.
Figure 5:
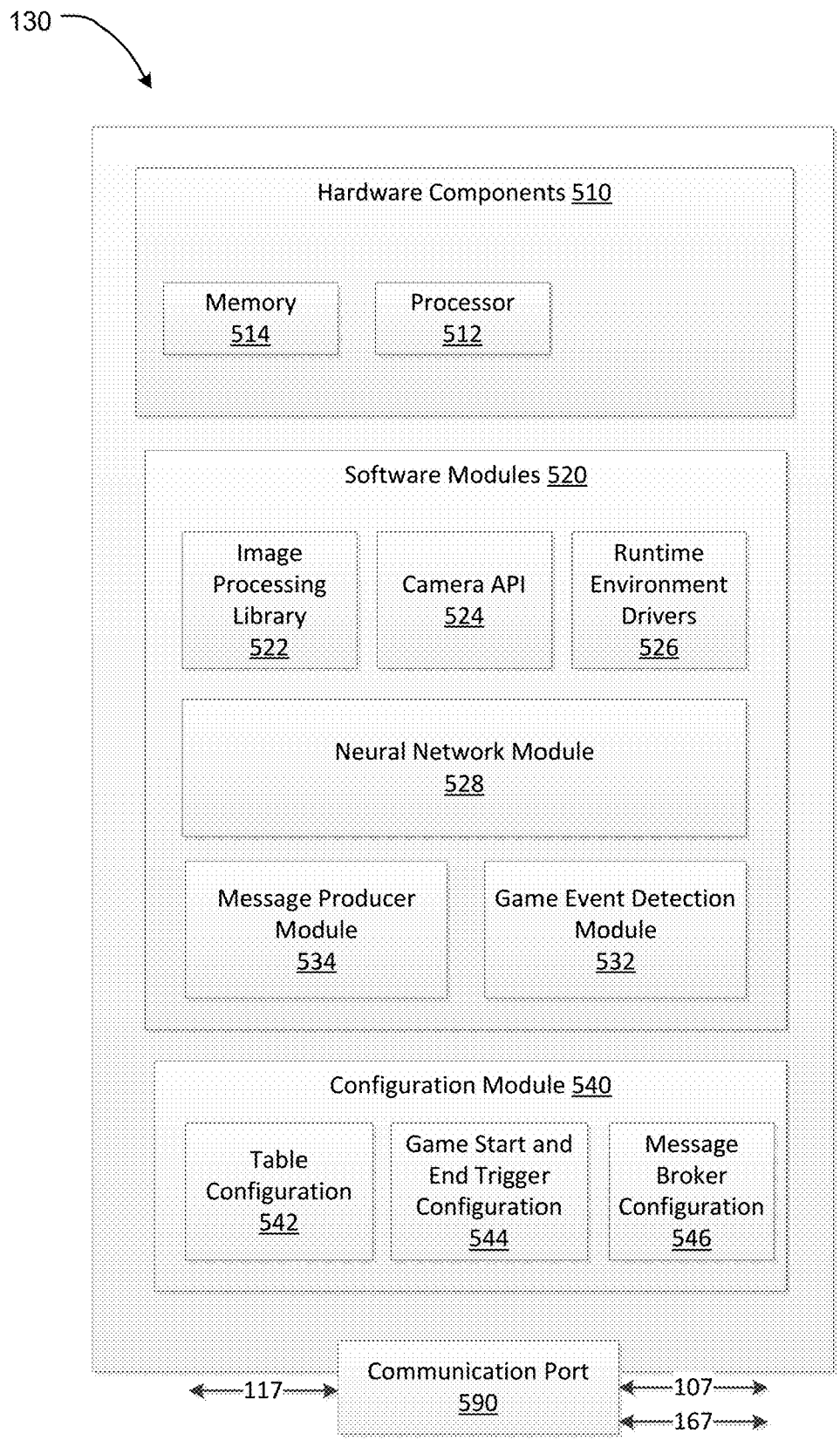
FIG. 5 is a block diagram of a computing device according to some embodiments.
Figure 6:
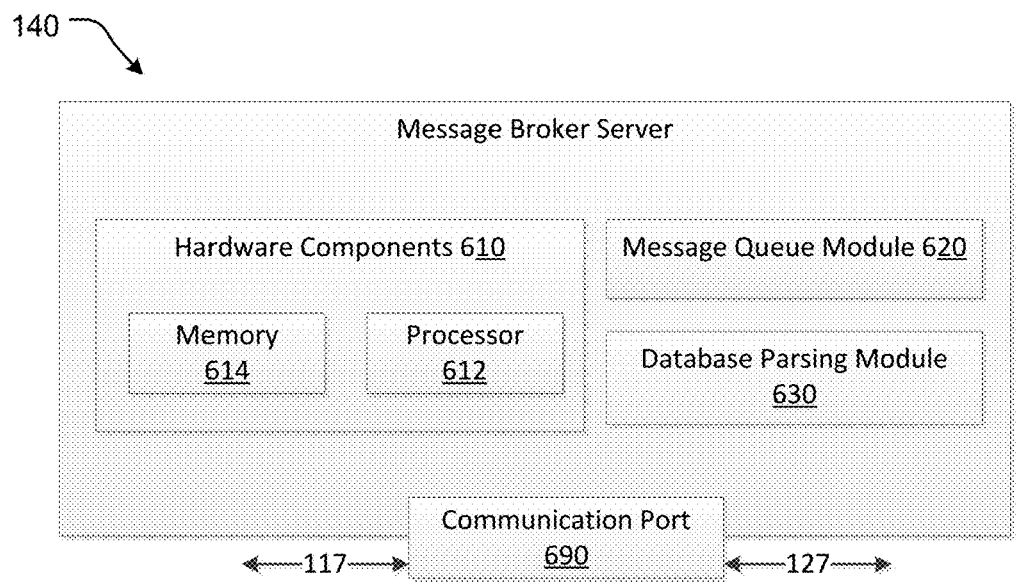
FIG. 6 is a block diagram of a message broker server according to some embodiments.
Figure 7:
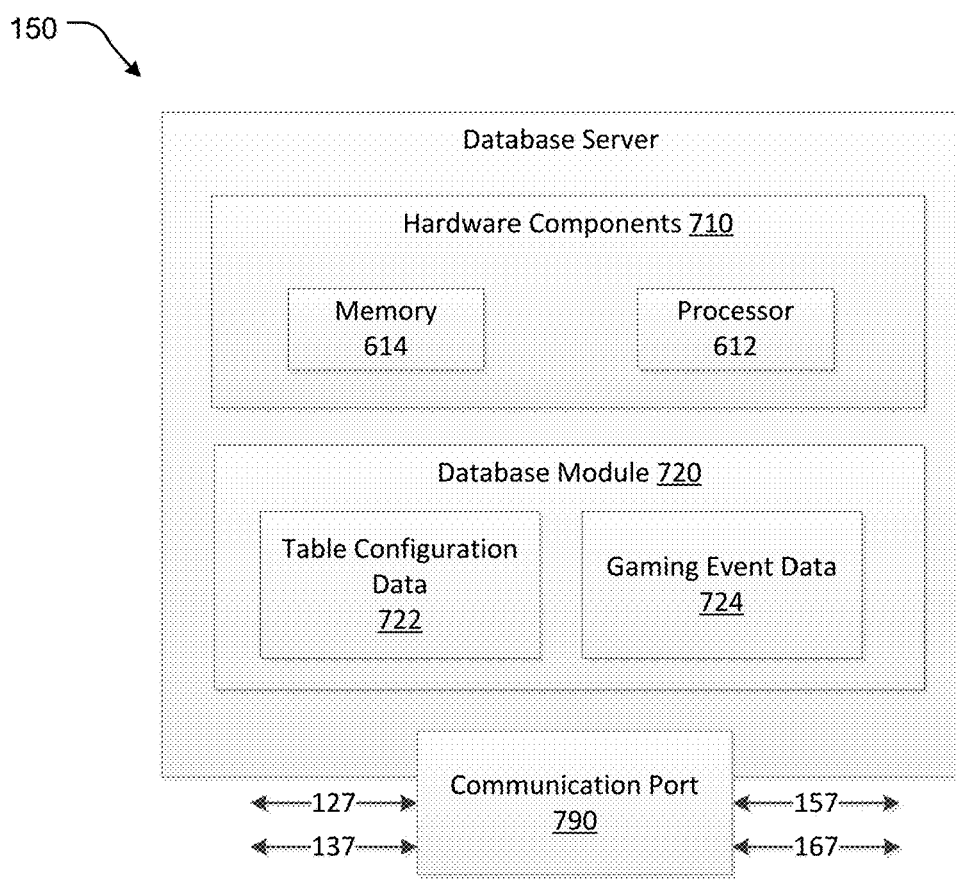
FIG. 7 is a block diagram of a database server according to some embodiments.

In order to prepare a substantial data set for training the machine learning or neural network algorithms, regions of interest may be manually drawn or identified in images captured from games on the gaming table. The regions of interest may be manually tagged with relevant identifiers, such as wager objects, persons, cards or other game objects, for example using an annotation or tagging tool as illustrated in FIG. 4C. An example of a suitable annotation tool is the "LabelImg" tool accessible through GitHub that provides an annotation XML file of each file in Pascal VOC format. Further, additional parameters, for example relating to a difficult object or segmented object may also be identified by manual tagging using a tagging tool with respect to a region of interest.

The process of annotation of images in a training data set may be improved by utilising the output produced by a previously trained neural network or a neural network trained with manually annotated images. The output produced by a previously trained neural network or a neural network trained with manually annotated images may be modified manually to correct any errors in both the identification of regions of interest and the identity of objects in the region of interest. The corrected output may be used as an input in the next iteration of the training of the neural network to further improve the accuracy of the results. This feedback loop may be repeated with several different data sets to obtain a robust neural network capable of identifying objects under varying conditions reliably.

Further robustness in the training of the neural networks may be achieved by applying data augmentation or other techniques to the training data, such as: randomly horizontally flipping input images; randomly changing the brightness of the input images; randomly scaling training image sizes by set scaling ratios; converting random colour images to greyscale; or randomly introducing jitters or variations in object box dimensions of the input regions of interest used as input for the RPN. One or more such data augmentation processes may be applied in training the gaming table RPN 920 and/or the wager object RPN 940.

Wager Object Value Estimation

Figure 11:
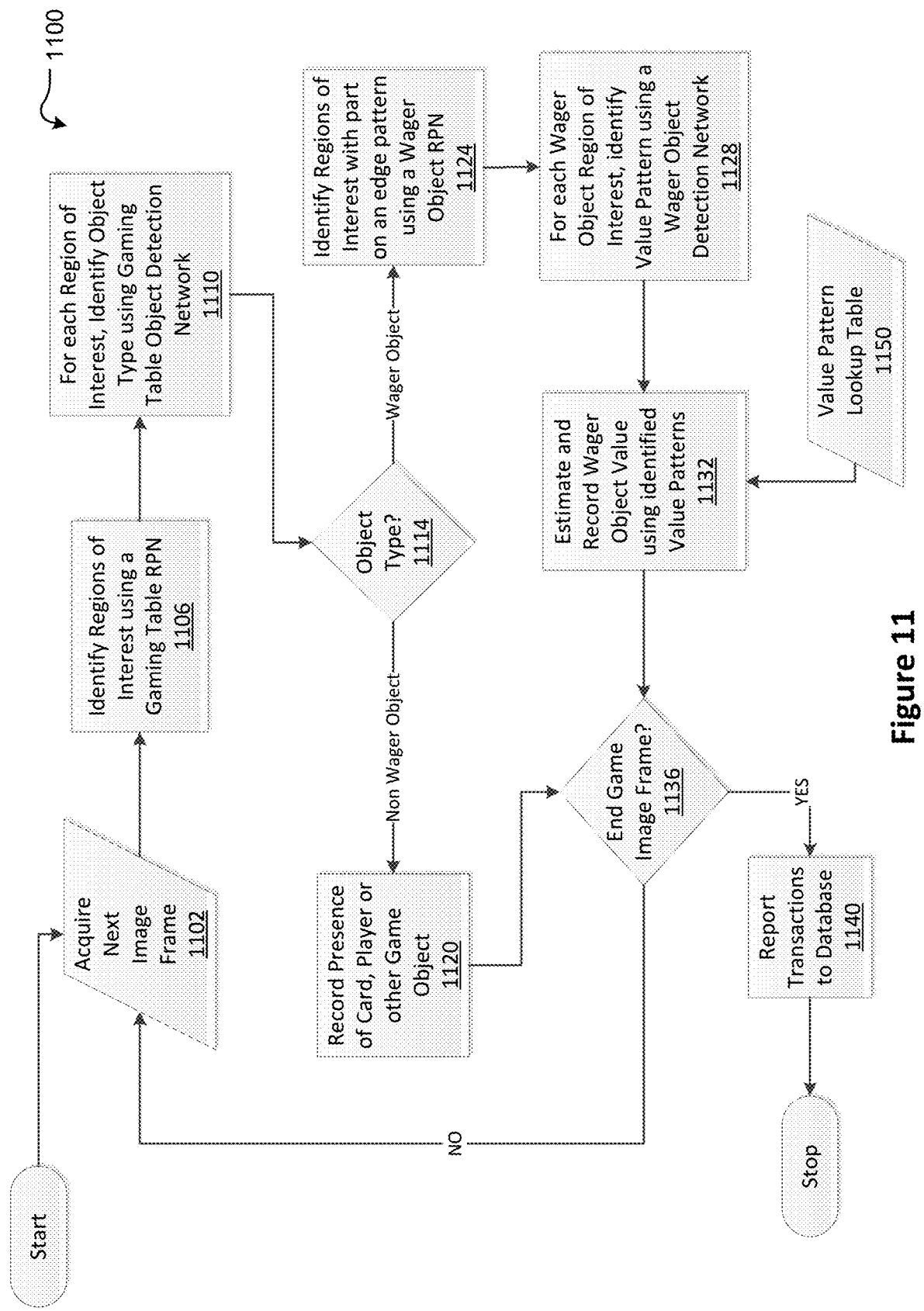
FIG. 11 is a flowchart of a method of object detection according to some embodiments.

The flowchart 1100 in FIG. 11 illustrates an overall game object detection and wager object value estimation process or method according to some embodiments. This method may be applied to both images captured in near real time or images stored from a previously played game. The first step 1102 involves retrieving an image frame that may be used as an input to the trained Gaming Table RPN 920. At step 1106 the trained Gaming Table RPN 920 identifies regions of interest in the input image. As an example, if the image frame of FIG. 4A is used as an input, the image frame shown in the screenshot of FIG. 4B may be generated as an output, showing the proposed regions of interest 421, 422, 423, 425 and 427.

The Gaming Table RPN 920 is constrained to identify not more than a particular number of regions of interest. This constraint is necessary in order to maintain adequate performance of the Gaming Table RPN 920 without requiring excessively high configurations of the computing device 130 in terms of processing power. In some embodiments, this constraint may be set to identify a maximum number, for example in the range of 30 to 70, regions of interest. In other embodiments, this constraint may be set to identify a maximum of 40 to 60 regions of interest, for example.

Once the proposed regions of interest are identified, the part of the image corresponding to each region of interest is provided as an input to the Gaming Table Object Detection Network 930 at step 1110. The Gaming Table Object Detection Network 930 detects players in the regions of interest 422 and 421. The regions of interest 423 and 425 are determined by the gaming table object detection network 930 to contain card objects. The region of interest 427 is determined by the wager object detection network 950 to contain a wager object. At step 1114, regions of interest that encompass wager objects proceed through to step 1124. Regions of interest where non-wager objects are detected proceed through to step 1120, where the nature of the detected object is recorded along with its co-ordinates.

Wager objects may comprise a single chip or a stack of multiple chips. A stack of multiple chips may comprise chips of various denominations (i.e. various associated chip values). In most gaming venues, the denomination of a chip or wager object is designated or identified with the colour of the chip and also designated or identified by a specific pattern on the edge of a chip. The edge pattern on a chip or a wager object may be symmetrically positioned about or around the circumference of the chip or other wager object at multiple (e.g. 4) different points. The edge pattern of a chip of a particular value may include stripes or edge patterns of a specific colour different from the colour or edge patterns of chips of a different value.

The systems and techniques described herein assume that a gaming object in the form of a gaming chip will have a generally circular profile in plan view and a generally uniform depth or thickness in side elevation, such that each chip resembles a short cylinder (or a cylinder have a height much less than its diameter).

For example, a chip or wager object of a denomination of one dollar may be white in colour with a single grey stripe. A chip of a denomination of five dollars may be red in colour with yellow stripes. The design of chips and specific colours and edge patterns representing the value of chips may vary from one gaming venue to another. Nevertheless, the Gaming Monitoring System 100 and specifically the Neural Networks Module 528 may be configured to detect or identify the specific edge pattern of chips in a gaming venue where the system 100 is to be deployed.

In order to estimate the value of a stack of wager objects (chips) on a gaming table, surface patterns, such as the patterns on the outer cylindrical (annular) edge, of each individual chip are identified. Additionally, for the top chip in a chip stack, top surface indicia relating to or defining a value of the chip may also be identified as one or more regions of interest, so that such regions can be used to validate a value of the chip determined based on the detected edge pattern. The top and edge pattern identification may be accomplished by a Wager Object RPN 940 and a Wager Object Detection Network 950. The Wager Object RPN 940 and a Wager Object Detection Network 950 may employ similar techniques for initialisation and training as the Gaming Table RPN 920 and a Gaming Table Object Detection Network 930. However, the Wager Object RPN 940 at step 1124 is trained to propose regions of interest in a wager object image frame, including the regions of interest covering or bounding parts of edge patterns of every single wager object in a stack of wager objects, as well as regions of interest covering or bounding parts of a top wager object surface of the stack.

Figure 13:
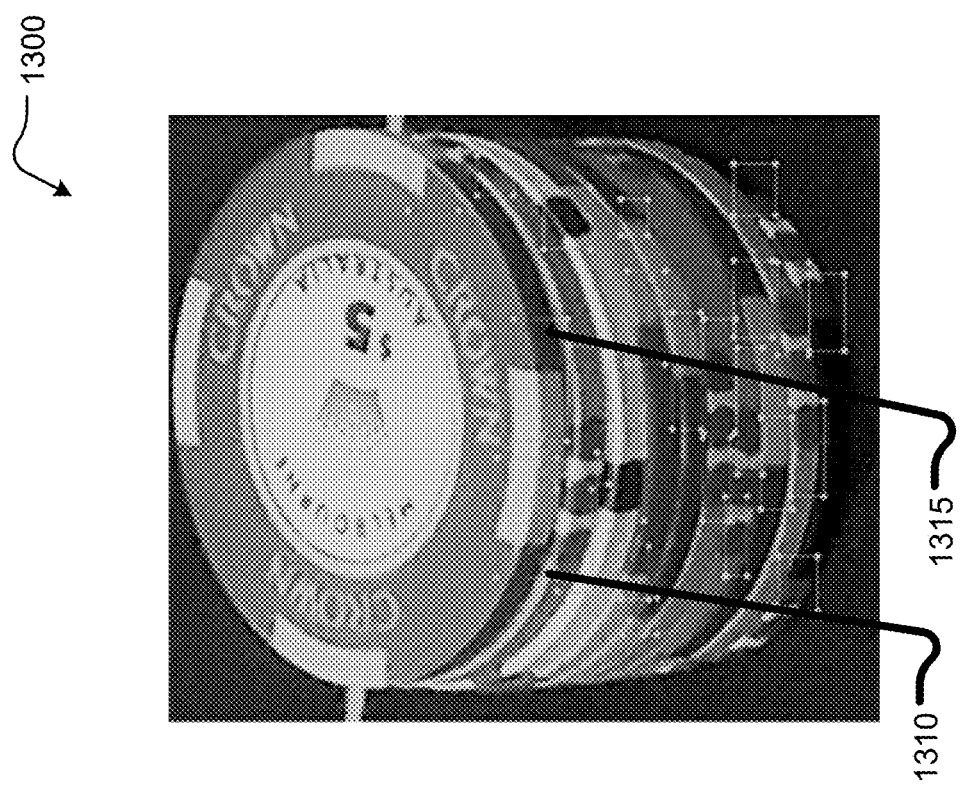
FIG. 13 is an example image of a stack of chip game objects, showing detection of regions of interest in a wager object image.
Figure 12:
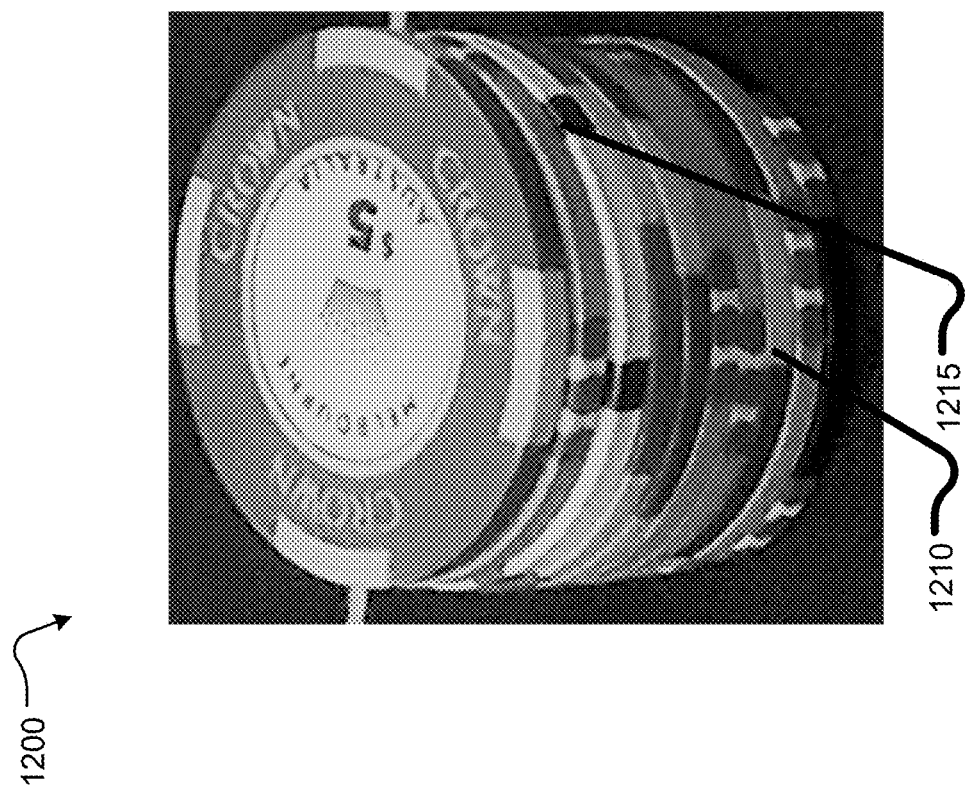
FIG. 12 is an example image of a stack of chip game objects.

The Wager Object RPN 940 proposes regions of interest bounding part of an edge pattern on a single wager object and the Wager Object Detection Network 950 identifies a value pattern of the proposed region of interest at step 1128. The value pattern may be the value associated with a specific part of an edge pattern on a wager object that is bounded by a region of interest proposed by the Wager Object RPN 940. The Neural Network Module 528 may comprise a value pattern lookup table 1150 that records the denomination value associated with a specific detectable value pattern by the Wager Object Detection Network 950 (including top surface indicia for a top wager object). The contents of the value pattern lookup table 1150 may be varied across different gaming venues to reflect different design and edge patterns on wager object or chips in different venues. As an example, the image frame 1200 may be an input image for the Wager Object RPN 940. Edge patterns 1210 and 1215 may reflect values associated with specific wager objects that are a part of a stack of wager objects in the image frame 1200. FIG. 13 may be an output image produced by the Wager Object RPN 940 with various different regions of interest 1310 and 1315 bounding parts of edge patterns.

The regions of interest identified by Wager Object RPN 940 may only be rectangular in shape and the edges of the rectangle must be parallel to the edges of the input image. However, a wager object that is a gaming chip is somewhat circular (when resting on a table as seen from an elevated and angled position such as from cameras 120 and/or 320) and if the entire edge pattern of a wager object is encompassed in a rectangular region of interest, then the rectangular (defined) region of interest may comprise edge patterns of other vertically or horizontally adjacent wager objects. This may degrade the accuracy of performance of the Wager Detection Network 950 as isolation of objects to be identified in the proposed regions of interest is vital for accuracy in object detection. To overcome this, instead of treating the entire edge pattern of a wager object as a target for object detection, the Wager Object RPN 940 is trained to identify ends of each visible edge pattern at step 1128. For example, the regions of interest 1310 and 1315 identified in the image frame 1300 bound or cover only one part of an edge pattern on wager object. Such edge patterns are distinct and spaced around the circumference of the chip and are separated by non-patterned edge regions. Thus, what is detected as an edge pattern may be the transition from a patterned region to a non-patterned region along the edge of the chip.

At step 1132, the detected value patterns (which may be part of an edge pattern of a wager object and the values associated with the edge pattern) are compared against values in the value pattern lookup table 1150 to estimate the value of every single wager object in a stack of wager objects. The associated chip values of each detected value pattern are summed by a process executed by neural network module 528 or another one of the software modules 520 to generate a value determination outcome. This outcome is used to estimate the value of the entire stack or multiple stacks of wager objects (chips) at step 1132.

At step 1136, the Neutral Networks Module 528 checks if the next image frame in the series represents an end of game event. If an end of game event is detected, then the stored observations regarding game objects, number and/or position of players and estimated value of wager objects is reported to the database server 150 through the message broker server 140 at step 1140. If an end of game event is not detected, then the entire process 1100 continues to process the next image frame by returning to step 1102.

A trained neural network when deployed in the computing device 130 through the neural networks module 528 is not necessarily static or fixed. A deployed neural network may undergo subsequent training based on the data recorded on the database server 150 obtained through the actual operation of the gaming monitoring system 100. The neural network manager server 160 has access to the game object detection data and wager object value estimation data in the database server 150 through the network link 137. Based on this data and additional correction data that may be provided to the neural network manager server 160 over time, further training of the deployed neural networks module 528 may be carried out. If further training produces neural networks that outperform a currently deployed set of neural networks, then the neural networks manager server 160 may replace the deployed neural networks with the better performing neural networks obtained after subsequent training. This feedback may further improve the accuracy or performance of the gaming monitoring system 100.

In some embodiments, the gaming environment 110 may comprise a device, such as a shoe or a card shuffling device or a card dealing device (232). Often shoes or shuffling or dealing devices comprise a mechanism to verify the authenticity of the cards being processed by the device. The verification mechanism may be in place to detect or prevent the practice of card switching, whereby a player replaces a genuine card with a counterfeit card to affect an outcome of a game. Shoes or shuffling or dealing devices may also verify the process of dealing of cards by the dealer by keeping track of the order of the cards being drawn. Shoes or dealing shuffling devices may rely on a unique code printed on each card. The unique code is read by the shoe or the dealing or shuffling device as the card is dealt and counterfeit cards are detected in the process of dealing. Shoes or shuffling devices often comprise an indicator light, such as an LED light (234). The illumination of the indicator light may indicate a discrepancy or an unexpected card or outcome in a game. The indicator light is often positioned on an upper part of the shoe or shuffling device visible to the dealer and the general public in the gaming area.

In some embodiments the camera 120 may be positioned to capture the illumination of the indicator light positioned on the shoe or the dealing or shuffling device. The computing device 130 may be configured to assess or determine the illumination of the indicator light to identify the occurrence of a discrepancy as indicated by the shoe or the shuffling or dealing device. The assessment or determination may be based on the predetermined set or region of pixels covering the indicator light in the images captured by the camera 120. The computing device 130 may communicate and record the occurrence of the discrepancy through the message broker server 140 enabling a response by casino monitoring authorities to the discrepancy.

In some embodiments, the computing device 130, may be configured to detect and identify game objects including playing cards or monetary objects such as cash, bills and coins placed on the gaming surface. Card or cash detection may be implemented through a machine learning process. The machine learning process may comprise implementation of a trained neural network that performs the function of identifying regions of interest, identifying objects in the identified regions of interest based on polygon extraction or masking or image segmentation. In some embodiments a mask R-CNN may be implemented to perform the function of card or cash detection.

A mask R-CNN is a type of convolutional neural network which provides a framework for object instance segmentation or masking. Object instance segmentation or masking allows the identification of objects and all of the pixels associated with an identified object in an image. The pixels identified by a trained mask R-CNN need not be of a predefined rectangular shape. The pixels identified by a trained mask R-CNN closely estimate an outline of an identified object. One advantage of mask R-CNN is the ability to identify overlapping objects more accurately. On gaming surfaces, cards or cash may be placed by players or the dealer in an overlapping manner. Further the cards or cash may have a variable orientation when placed on the gaming surface, making accurate object detection challenging. Trained mask R-CNNs provide greater accuracy in estimation of objects like cards or cash.

The mask R-CNN has a similar structure to the faster R-CNN described above. However, in addition to the structures included in faster R-CNN, the mask R-CNN further comprises a branch or a masking branch that performs instance segmentation or masking and outputs a mask to identify whether each pixel in an input image is part of an identified region of interest or object. In some embodiments, the detection of the mask may occur in parallel to the identification of objects. The masking branch may comprise a separate fully convolutional neural network applied to each identified region of interest to produce a segmentation mask at the pixel level in the form of a binary mask identifying whether a pixel is part of a detected object or not.

Figure 14:
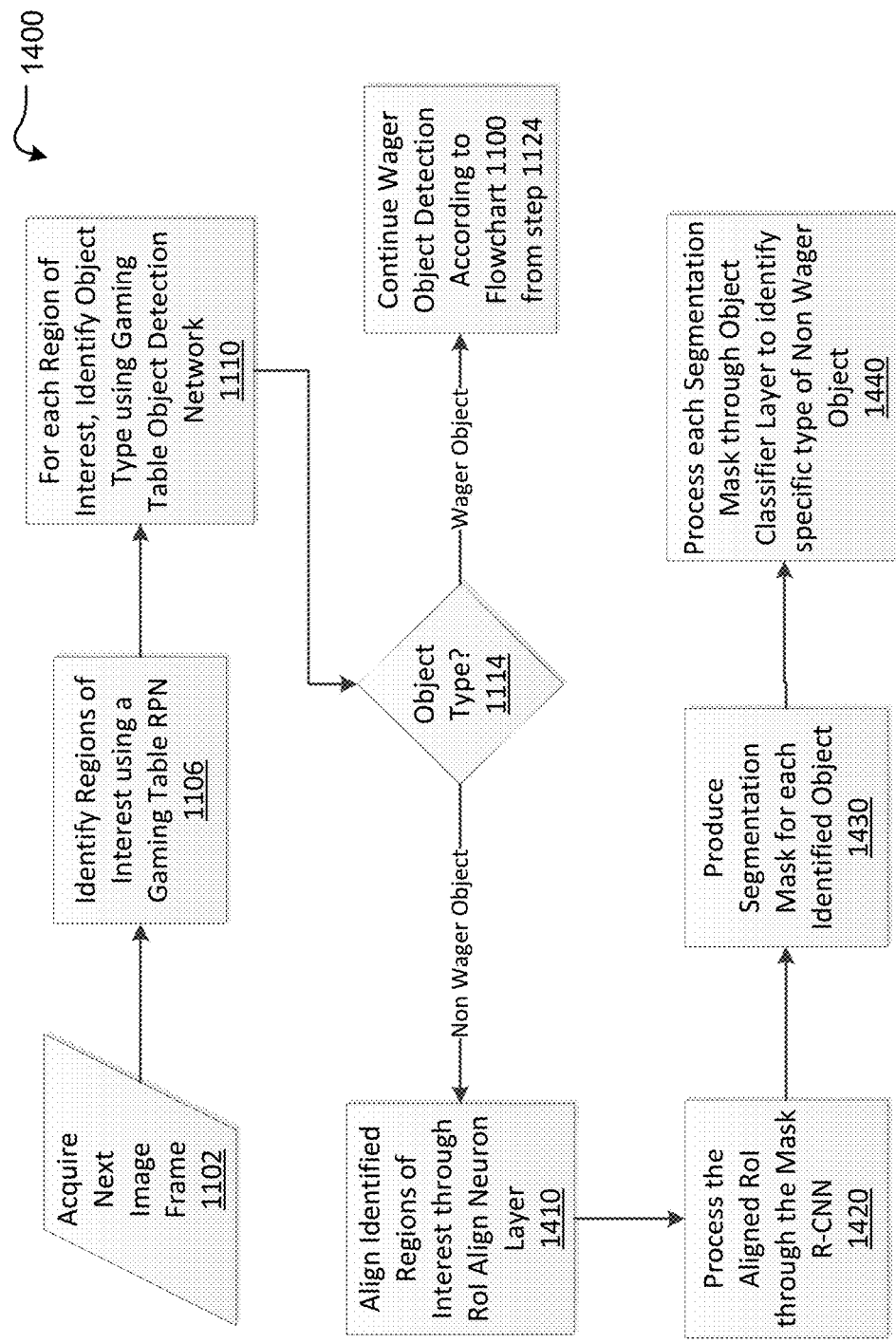
FIG. 14 is flowchart of the process of detection of non-wager objects according to some embodiments.

FIG. 14 illustrates flowchart 1400 for masking and detection of non-wager objects such as playing cards or cash according to some embodiments. Flowchart 1400 includes the steps 1102, 1106, 1110, and 1114 of flowchart 1100 of FIG. 11. In addition, flowchart 1400 includes steps for image segmentation and object detection for non-wager objects. At step 1410, the regions of interest identified in step 1110 are processed through a region of interest alignment neuron layer to improve the alignment of the boundaries of the identified regions of interest in order to improve the subsequent step of image segmentation or masking process. At step 1420 the aligned regions of interest are processed through a trained Mask R-CNN. After processing through the trained Mask R-CNN, output in the form of a binary segmentation mask for each non-wager object identified at step 1114 is produced at step 1430. The output may be in the form of a binary segmentation mask for each identified object, wherein each binary segmentation mask represents a set of pixels in the captured image that are associated with an identified object.

At step 1440 the regions of the captured image corresponding to the identified binary segmentation masks are processed through a trained object classifier. The trained object classifier, further classifies the identified object in each identified binary segmentation mask. For example, the object classifier may classify an object as an ace of spades in an identified binary segmentation mask. Alternatively, the object classifier may classify an object to be a monetary object, such as a note or bill of particular denomination, for example a note of $50 denomination. Information regarding the identified and classified object may be stored by the computing device 130 or alternatively the computing device 130 may transmit the information to the message broker server 140 through the communication link 117. Information regarding the cards presented on the gaming surface or monetary objects held out on the gaming surface by players may allow the reconciliation of past gaming events against game outcome records. Further, the identification of monetary objects held out on the gaming surface may allow the assessment of wagering activities at a table not assessable by detection of wager objects.

Object classification at step 1440 may be performed using a capsule neural network, or an inception neural networks or deep neural networks trained using a residual learning framework.

Figure 15:
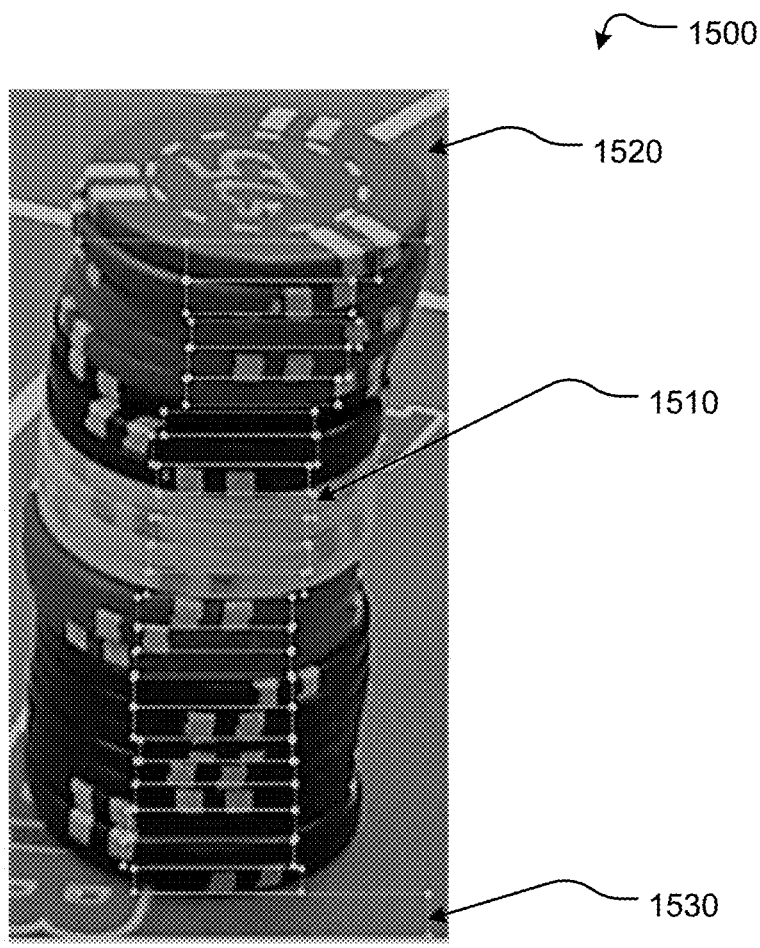
FIG. 15 is an image of a stack wager objects detected according to some embodiments.

FIG. 15 illustrates a screenshot 1500 of the result of wager object region detection according to some embodiments. The Wager Object RPN 940 of some embodiments may be additionally trained to detect a top wager object 1520 and a base region 1530 for a wager object stack or a wager object region. For example, in screenshot 1500, a top wager object 1520 and a wager object base region 1530 is detected by the Wager Object RPN 940. The Wager Object RPN 940 also detects edge patterns 1510 for wager objects that form part of the wager object stack. The top wager object 1520 and the wager object base region 1530 serve as anchor points for the overall wager object detection, thereby improving the accuracy and performance of the overall object detection process and also provide a means for verification of results.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A gaming monitoring system comprising:
at least one camera configured to capture images of a gaming surface; and
a computing apparatus in communication with the at least one camera, said computing apparatus configured to analyse the captured images of the gaming surface to automatically apply machine learning processes to identify game objects, game events and players in the captured images, wherein
the game objects comprise one or more stacks of one or more wager objects, and
the computing apparatus is further configured to automatically identify and estimate a value of each stack of one or more wager objects by,
identifying one or more first regions of interest in the captured image that relate to one game object using a trained first region proposal network;
identifying at least one subset of first regions of interest among the one or more first regions of interest that relate to a single stack of one or more wager objects using a trained first object detection network;
identifying one or more second regions of interest that relate to part of an edge pattern on each wager object that forms part of the single stack of one or more wager objects in each of the identified at least one subset of first regions of interest using a trained second region proposal network;
identifying a value pattern in each of the one or more second regions of interest using a trained second object detection network; and estimating a total wager value of the single stack of one or more wager objects in each of the at least one subset of first regions of interest using the identified value patterns and a lookup table.

2. The system of claim 1, wherein the machine learning processes are implemented through one or more neural networks.

3. The system of claim 2, wherein the one or more neural networks comprise one or more deep neural networks.

4. The system of claim 3, wherein the one or more deep neural networks comprise one or more convolutional neural networks.

5. The system of claim 4, wherein at least one of the one or more convolutional neural networks comprises at least one of: a region proposal network; or an object detection network.

6. The system of claim 1, wherein the game objects further comprise playing cards, position markers or monetary objects.

7. The system of claim 1, wherein the said computing apparatus is further configured to associate each of the one or more first regions of interest with a wager area identifier.

8. The system of claim 1, wherein the computing apparatus is further configured to identify a start and end of a game based on a game start and end trigger configuration stored in a data store accessible to the computing apparatus.

9. The gaming monitoring system of claim 1, wherein the computing apparatus is further configured to determine an illumination of an indicator light on a dealing device on the gaming surface.

10. A computer system or apparatus configured to execute a neural network system for game object identification, comprising:
   at least one processor; and
   a memory accessible to the at least one processor and storing code to execute,
      a wager object region proposal network (RPN) to receive image data from captured images of a gaming table; and
      a wager object detection network to receive an output of the wager object RPN;
   wherein the wager object detection network detects one or more wager objects in the captured images based on an output of the wager object region proposal network.

11. The computer system or apparatus of claim 10, further comprising:
   a gaming table region proposal network (RPN) to receive image data from captured images of a gaming table; and
   a gaming table object detection network to receive an output of the gaming table RPN;
   wherein the gaming table object detection network detects one or more gaming objects in the captured images based on an output of the gaming table object detection network, wherein the one or more gaming objects are different from the one or more wager objects.

12. The system of claim 11, wherein the wager object region proposal network (RPN) is further configured to identify one or more first regions of interest in the captured image that relate to the one or more wager objects.

13. The system of claim 12, wherein the wager object region proposal network (RPN) is further configured to determine a wager area identifier associated with the one or more first regions of interest.

14. A gaming monitoring system comprising:
   at least one camera configured to capture images of a gaming surface; and
   a computing apparatus in communication with the at least one camera, said computing apparatus configured to analyse the captured images of the gaming surface to automatically apply machine learning processes to identify game objects, game events and players in the captured images;
   wherein the machine learning processes are implemented through one or more convolutional neural networks, and
   wherein the one or more convolutional neural networks comprise a first convolutional neural network for performing image segmentation to determine an outline of a game object in the captured image, wherein the one or more convolutional neural networks comprises a game object classifier neural network configured to classify the game object in the determined outline.

15. The system of claim 14, wherein
the game objects include wager objects; and
the one or more convolutional neural networks comprise a second convolutional neural network for performing image processing operations to determine a wager value of the wager objects.

16. The system of claim 14, wherein
the game objects include wager objects; and
the computing apparatus is further configured to determine a wager area identifier based on the determined outline of the wager objects.

* * * * *